US008583553B2

(12) United States Patent
Cohen et al.

(10) Patent No.: US 8,583,553 B2
(45) **Date of Patent: *Nov. 12, 2013**

(54) CONDITIONALLY OBFUSCATING ONE OR MORE SECRET ENTITIES WITH RESPECT TO ONE OR MORE BILLING STATEMENTS RELATED TO ONE OR MORE COMMUNIQUÉS ADDRESSED TO THE ONE OR MORE SECRET ENTITIES

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/927,966

(22) Filed: Nov. 29, 2010

(65) Prior Publication Data

US 2011/0166974 A1 Jul. 7, 2011

Related U.S. Application Data

(63) Continuation-in-part of application No. 12/228,664, filed on Aug. 14, 2008, and a continuation-in-part of application No. 12/228,873, filed on Aug. 15, 2008, and a continuation-in-part of application No. 12/287,268, filed on Oct. 7, 2008, now Pat. No. 8,224,907, and a continuation-in-part of application No. 12/454,113, filed on May 12, 2009, and a continuation-in-part of application No. 12/799,794, filed on Apr. 29, 2010, and a continuation-in-part of application No. 12/802,139, filed on May 27, 2010, and a continuation-in-part of application No. 12/802,136, filed on May 28, 2010, and a continuation-in-part of application No. 12/802,863, filed on Jun. 14, 2010, and a continuation-in-part of application No. 12/802,922, filed on Jun. 15, 2010, and a continuation-in-part of application No. 12/804,765, filed on Jul. 27, 2010, and a continuation-in-part of application No. 12/804,832, filed on Jul. 28, 2010, and a continuation-in-part of application No. 12/806,677, filed on Aug. 17, 2010, and a continuation-in-part of application No. 12/806,738, filed on Aug. 18, 2010, and a continuation-in-part of application No. 12/807,700, filed on Sep. 9, 2010, and a continuation-in-part of application No. 12/807,701, filed on Sep. 10, 2010, and a continuation-in-part of application No. 12/924,992, filed on Oct. 8, 2010, and a continuation-in-part of application No. 12/925,014, filed on Oct. 12, 2010, and a continuation-in-part of application No. 12/927,500, filed on Nov. 15, 2010, and a continuation-in-part of application No. 12/927,555, filed on Nov. 16, 2010, and a continuation of application No. 12/927,791, filed on Nov. 22, 2010.

(51) Int. Cl.
*G06Q 40/00* (2012.01)

(52) U.S. Cl.
USPC .............................................. 705/40; 705/35

(58) Field of Classification Search
USPC .................................................... 705/35, 40
See application file for complete search history.

(56) References Cited

U.S. PATENT DOCUMENTS 3,985,972 A 10/1976 Rolin et al.
4,218,738 A 8/1980 Matyas et al.

(Continued)

OTHER PUBLICATIONS

U.S. Appl. No. 12/927,791, Cohen et al.

(Continued)

*Primary Examiner* — James A Vezeris

(57) ABSTRACT

A computationally implemented method includes, but is not limited to: associating one or more fees with one or more communiqués that were transmitted by a particular end user and addressed to one or more secret entities; and providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements. In addition to the foregoing, other method aspects are described in the claims, drawings, and text forming a part of the present disclosure.

41 Claims, 15 Drawing Sheets

(56) References Cited

U.S. PATENT DOCUMENTS 5,493,692 A 2/1996 Theimer et al.
5,508,699 A 4/1996 Silverman
5,732,138 A 3/1998 Noll et al.
5,751,806 A 5/1998 Ryan
5,812,639 A 9/1998 Bartholomew et al.
5,835,856 A 11/1998 Patel
5,933,498 A 8/1999 Schneck et al.
6,005,926 A 12/1999 Mashinsky
6,026,291 A 2/2000 Carlsson et al.
6,199,102 B1 3/2001 Cobb
6,224,109 B1 5/2001 Yang
6,351,745 B1 2/2002 Itakura et al.
6,396,531 B1 5/2002 Gerszberg et al.
6,496,931 B1 12/2002 Rajchel et al.
6,510,236 B1 1/2003 Crane et al.
6,522,889 B1 2/2003 Aarnio
6,529,592 B1 3/2003 Khan
6,563,913 B1 5/2003 Kaghazian
6,591,291 B1 7/2003 Gabber et al.
6,738,808 B1 5/2004 Zellner et al.
6,816,885 B1 11/2004 Raghunandan
6,857,021 B1 2/2005 Sidhu et al.
6,918,039 B1 7/2005 Hind et al.
6,937,730 B1 8/2005 Buxton
6,985,569 B2 1/2006 Baker
6,990,590 B2 1/2006 Hanson et al.
7,007,025 B1 2/2006 Nason et al.
7,133,837 B1 11/2006 Barnes, Jr.
7,159,011 B1 1/2007 Knight et al.
7,203,315 B1 4/2007 Livesay
7,225,342 B2 5/2007 Takao et al.
7,248,885 B2 7/2007 Benco et al.
7,275,090 B2 9/2007 Oeda et al.
7,308,251 B2 12/2007 Karaoguz
7,310,816 B1 12/2007 Burns et al.
7,327,312 B1 2/2008 Harris
7,334,267 B2 2/2008 Engstrom
7,363,024 B2 4/2008 Jenkins
7,382,881 B2 6/2008 Uusitalo et al.
7,389,541 B2 6/2008 Jia et al.
7,400,878 B2 7/2008 Hassan et al.
7,401,159 B1 7/2008 Aviani et al.
7,458,095 B2 11/2008 Forsberg
7,567,936 B1 7/2009 Peckover et al.
7,614,081 B2 11/2009 Prohel et al.
7,616,943 B2 11/2009 Oesterling
7,623,639 B2 11/2009 Thai et al.
7,627,334 B2 12/2009 Cohen et al.
7,630,495 B2 12/2009 Kiiveri et al.
7,634,295 B2 12/2009 Hayaashi et al.
7,643,484 B2 1/2010 Willman et al.
7,724,918 B2 5/2010 Balakrishnan et al.
7,783,741 B2 8/2010 Hardt
7,787,870 B2 8/2010 Burgan et al.
7,797,024 B2 9/2010 Sutardja
7,814,017 B2 10/2010 Vancini et al.
7,920,050 B2 4/2011 Juels et al.
7,921,052 B2 4/2011 Dabney et al.
7,966,664 B2 6/2011 Makkinejad
8,140,062 B1 3/2012 Hildner et al.
8,190,128 B1 5/2012 Lundy et al.
8,224,907 B2 * 7/2012 Cohen et al. .................. 709/206
2001/0023432 A1 9/2001 Council et al.
2001/0031631 A1 10/2001 Pitts
2001/0034677 A1 10/2001 Farhat et al.
2001/0034723 A1 10/2001 Subramaniam
2001/0036822 A1 11/2001 Mead et al.
2002/0044067 A1 4/2002 Ilcisin
2002/0077078 A1 6/2002 Antti
2002/0081972 A1 6/2002 Rankin
2002/0099822 A1 7/2002 Rubin et al.
2002/0111954 A1 8/2002 McCoy
2002/0143869 A1 10/2002 Cohen
2002/0154055 A1 10/2002 Davis et al.
2002/0163572 A1 11/2002 Center, Jr. et al.
2002/0169664 A1 11/2002 Walker et al.
2002/0169840 A1 11/2002 Sheldon et al.
2002/0174073 A1 11/2002 Nordman et al.
2002/0174363 A1 11/2002 Chefalas et al.
2002/0177449 A1 11/2002 McDonnell et al.
2002/0188562 A1 12/2002 Igarashi et al.
2002/0198777 A1 12/2002 Yuasa
2003/0008672 A1 1/2003 Fujii
2003/0009593 A1 1/2003 Apte
2003/0014286 A1 1/2003 Cappellini
2003/0014637 A1 1/2003 Ellison et al.
2003/0021413 A1 1/2003 Kiiveri et al.
2003/0044050 A1 3/2003 Clark et al.
2003/0086543 A1 5/2003 Raymond
2003/0134645 A1 7/2003 Stern et al.
2003/0145039 A1 7/2003 Bonney et al.
2003/0149881 A1 8/2003 Patel et al.
2003/0154254 A1 8/2003 Awasthi
2003/0158960 A1 8/2003 Engberg
2003/0177357 A1 9/2003 Chamberlin et al.
2003/0217151 A1 11/2003 Roese et al.
2003/0217287 A1 11/2003 Kruglenko
2003/0220978 A1 11/2003 Rhodes
2003/0224754 A1 * 12/2003 Herzog ......................... 455/406
2003/0227386 A1 12/2003 Pulkkinen et al.
2003/0233329 A1 12/2003 Laraki et al.
2004/0015553 A1 1/2004 Griffin et al.
2004/0030932 A1 2/2004 Juels et al.
2004/0064692 A1 4/2004 Kahn et al.
2004/0064734 A1 4/2004 Ehrlich
2004/0083166 A1 4/2004 Pailles
2004/0111625 A1 6/2004 Duffy et al.
2004/0139204 A1 7/2004 Ergezinger et al.
2004/0162904 A1 8/2004 Eida et al.
2004/0165702 A1 8/2004 Finnigan
2004/0178880 A1 9/2004 Meyer et al.
2004/0181683 A1 9/2004 Jia et al.
2004/0203776 A1 10/2004 Jun
2004/0248588 A1 12/2004 Pell et al.
2004/0254998 A1 12/2004 Horvitz
2004/0255127 A1 12/2004 Arnouse
2005/0004871 A1 1/2005 Dort
2005/0008135 A1 1/2005 Bressler
2005/0027618 A1 2/2005 Zucker et al.
2005/0031106 A1 2/2005 Henderson
2005/0044423 A1 2/2005 Mellmer et al.
2005/0048951 A1 3/2005 Saito
2005/0075096 A1 4/2005 Aljuraid
2005/0084100 A1 4/2005 Spies et al.
2005/0091393 A1 4/2005 Gleeson et al.
2005/0091543 A1 4/2005 Holtzman et al.
2005/0100140 A1 5/2005 Tsai
2005/0114343 A1 5/2005 Wesinger, Jr. et al.
2005/0136903 A1 6/2005 Kashima et al.
2005/0172120 A1 8/2005 Wang et al.
2005/0192056 A1 9/2005 Karaki
2005/0198131 A1 9/2005 Appelman et al.
2005/0204008 A1 9/2005 Shinbrood
2005/0204037 A1 9/2005 Levy
2005/0227705 A1 10/2005 Rousu et al.
2005/0232423 A1 10/2005 Horvitz et al.
2005/0246419 A1 11/2005 Jaatinen
2005/0275543 A1 12/2005 Hisano
2006/0005023 A1 1/2006 Homer et al.
2006/0026438 A1 2/2006 Stern et al.
2006/0031369 A1 2/2006 Caron et al.
2006/0041507 A1 2/2006 Novack et al.
2006/0052095 A1 3/2006 Vazvan
2006/0079238 A1 4/2006 Liu et al.
2006/0099967 A1 5/2006 Colvin et al.
2006/0109983 A1 5/2006 Young et al.
2006/0116142 A1 6/2006 Cofta
2006/0123245 A1 6/2006 Avidan et al.
2006/0152374 A1 7/2006 Singer et al.
2006/0167991 A1 7/2006 Heikes et al.
2006/0168059 A1 7/2006 Chang et al.
2006/0173957 A1 8/2006 Robinson et al.
2006/0176821 A1 8/2006 Hemesath et al.
2006/0227955 A1 10/2006 Thai et al.

(56) References Cited

U.S. PATENT DOCUMENTS

| | | | |
|---|---|---|---|
| 2006/0248011 | A1 | 11/2006 | Hecht-Nielsen et al. |
| 2006/0256959 | A1 | 11/2006 | Hymes |
| 2006/0274896 | A1 | 12/2006 | Livesay |
| 2006/0276226 | A1 | 12/2006 | Jiang |
| 2007/0022165 | A1 | 1/2007 | Daniels et al. |
| 2007/0030824 | A1 | 2/2007 | Ribaudo et al. |
| 2007/0032225 | A1 | 2/2007 | Konicek et al. |
| 2007/0036314 | A1 | 2/2007 | Kloberdans et al. |
| 2007/0074046 | A1 | 3/2007 | Czajkowski et al. |
| 2007/0127658 | A1 | 6/2007 | Gruchala et al. |
| 2007/0130323 | A1 | 6/2007 | Landsman et al. |
| 2007/0140145 | A1 | 6/2007 | Kumar et al. |
| 2007/0180122 | A1 | 8/2007 | Barrett |
| 2007/0203644 | A1 | 8/2007 | Thota et al. |
| 2007/0204026 | A1 | 8/2007 | Berger |
| 2007/0208816 | A1 | 9/2007 | Baldwin et al. |
| 2007/0208947 | A1 | 9/2007 | Sudo et al. |
| 2007/0242827 | A1 | 10/2007 | Prafullchandra et al. |
| 2007/0243880 | A1 | 10/2007 | Gits et al. |
| 2007/0250571 | A1 | 10/2007 | Griffin, Jr. |
| 2007/0250641 | A1 | 10/2007 | Flannery et al. |
| 2007/0255704 | A1 | 11/2007 | Baek et al. |
| 2007/0264974 | A1 | 11/2007 | Frank et al. |
| 2007/0277235 | A1 | 11/2007 | Barrett et al. |
| 2007/0293202 | A1 | 12/2007 | Moshir et al. |
| 2007/0294096 | A1 | 12/2007 | Randall et al. |
| 2008/0005325 | A1 | 1/2008 | Wynn et al. |
| 2008/0010665 | A1 | 1/2008 | Hinton et al. |
| 2008/0056468 | A1 | 3/2008 | Fredlund et al. |
| 2008/0071544 | A1 | 3/2008 | Beaufays et al. |
| 2008/0086646 | A1 | 4/2008 | Pizano |
| 2008/0108324 | A1 | 5/2008 | Moshir et al. |
| 2008/0118150 | A1 | 5/2008 | Balakrishnan et al. |
| 2008/0130630 | A1 | 6/2008 | Shim et al. |
| 2008/0146157 | A1 | 6/2008 | Aaron |
| 2008/0154697 | A1 | 6/2008 | Guday et al. |
| 2008/0163365 | A1 | 7/2008 | Austin et al. |
| 2008/0169903 | A1 | 7/2008 | Fein et al. |
| 2008/0196098 | A1 | 8/2008 | Cottrell et al. |
| 2008/0207329 | A1 | 8/2008 | Wallace et al. |
| 2008/0235336 | A1 | 9/2008 | Stern et al. |
| 2008/0247543 | A1 | 10/2008 | Mick et al. |
| 2008/0248815 | A1 | 10/2008 | Busch |
| 2008/0250129 | A1 | 10/2008 | Carpenter et al. |
| 2008/0254817 | A1 | 10/2008 | Tornkvist |
| 2008/0267099 | A1 | 10/2008 | Curcio et al. |
| 2008/0294726 | A1 | 11/2008 | Sidman |
| 2008/0300859 | A1 | 12/2008 | Chen et al. |
| 2008/0318598 | A1 | 12/2008 | Fry |
| 2009/0005072 | A1 | 1/2009 | Forstall et al. |
| 2009/0081989 | A1 | 3/2009 | Wuhrer |
| 2009/0099701 | A1 | 4/2009 | Li et al. |
| 2009/0109037 | A1 | 4/2009 | Farmer |
| 2009/0131022 | A1 | 5/2009 | Buckley et al. |
| 2009/0132419 | A1 | 5/2009 | Grammer et al. |
| 2009/0158054 | A1 | 6/2009 | Dijk et al. |
| 2009/0170532 | A1 | 7/2009 | Lee et al. |
| 2009/0183215 | A1 | 7/2009 | McCartie et al. |
| 2009/0195445 | A1 | 8/2009 | DeHaas |
| 2009/0204580 | A1 | 8/2009 | Seamon et al. |
| 2009/0215469 | A1 | 8/2009 | Fisher et al. |
| 2009/0227268 | A1 | 9/2009 | Sorensson et al. |
| 2009/0234764 | A1 | 9/2009 | Friesen |
| 2009/0248844 | A1 | 10/2009 | Sommer et al. |
| 2009/0275363 | A1 | 11/2009 | McGregor et al. |
| 2009/0298474 | A1 | 12/2009 | George |
| 2009/0318112 | A1 | 12/2009 | Vasten |
| 2009/0319172 | A1 | 12/2009 | Almeida et al. |
| 2010/0009657 | A1 | 1/2010 | Dingler et al. |
| 2010/0015991 | A1 | 1/2010 | Evans et al. |
| 2010/0024042 | A1 | 1/2010 | Motahari et al. |
| 2010/0053169 | A1 | 3/2010 | Cook |
| 2010/0071035 | A1 | 3/2010 | Budko et al. |
| 2010/0183125 | A1 | 7/2010 | Hayes, Jr. et al. |
| 2010/0257222 | A1 | 10/2010 | Hamilton, II et al. |
| 2010/0281051 | A1 | 11/2010 | Sheffi et al. |
| 2010/0283728 | A1 | 11/2010 | Hollemans et al. |
| 2010/0313253 | A1 | 12/2010 | Reiss |
| 2011/0143716 | A1 | 6/2011 | Shaw |
| 2011/0238767 | A1 | 9/2011 | Murphy |
| 2012/0174233 | A1 | 7/2012 | Waterson |

OTHER PUBLICATIONS

U.S. Appl. No. 12/927,555, Cohen et al.
U.S. Appl. No. 12/927,500, Cohen et al.
U.S. Appl. No. 12/925,014, Cohen et al.
U.S. Appl. No. 12/924,992, Cohen et al.
U.S. Appl. No. 12/807,701, Cohen et al.
U.S. Appl. No. 12/807,700, Cohen et al.
U.S. Appl. No. 12/806,738, Cohen et al.
U.S. Appl. No. 12/806,677, Cohen et al.
U.S. Appl. No. 12/804,832, Cohen et al.
U.S. Appl. No. 12/804,765, Cohen et al.
U.S. Appl. No. 12/802,922, Cohen et al.
U.S. Appl. No. 12/802,863, Cohen et al.
U.S. Appl. No. 12/802,139, Cohen et al.
U.S. Appl. No. 12/802,136, Cohen et al.
U.S. Appl. No. 12/799,794, Cohen et al.
U.S. Appl. No. 12/454,113, Cohen et al.
U.S. Appl. No. 12/287,268, Cohen et al.
U.S. Appl. No. 12/228,873, Cohen et al.
U.S. Appl. No. 12/228,664, Cohen et al.
"Sometimes, I just don't want them to know it's me calling . . . "; spoofcard.com; pp. 1-2; located at: http://www.spoofcard.com/; printed on Jul. 8, 2010.
"Spoof Caller ID with Telespoof.com"; Telespoof.com; Bearing a date of 2010; pp. 1-2; located at: http://www.telespoof.com/; printed on Jul. 8, 2010.
"Spoofkit is the ultimate windup kit available on the net today"; Spoofkit.com; Bearing dates of 2010-2014; pp. 1-6; located at: http://www.spoofkit.com/; printed on Jul. 8, 2010.

* cited by examiner

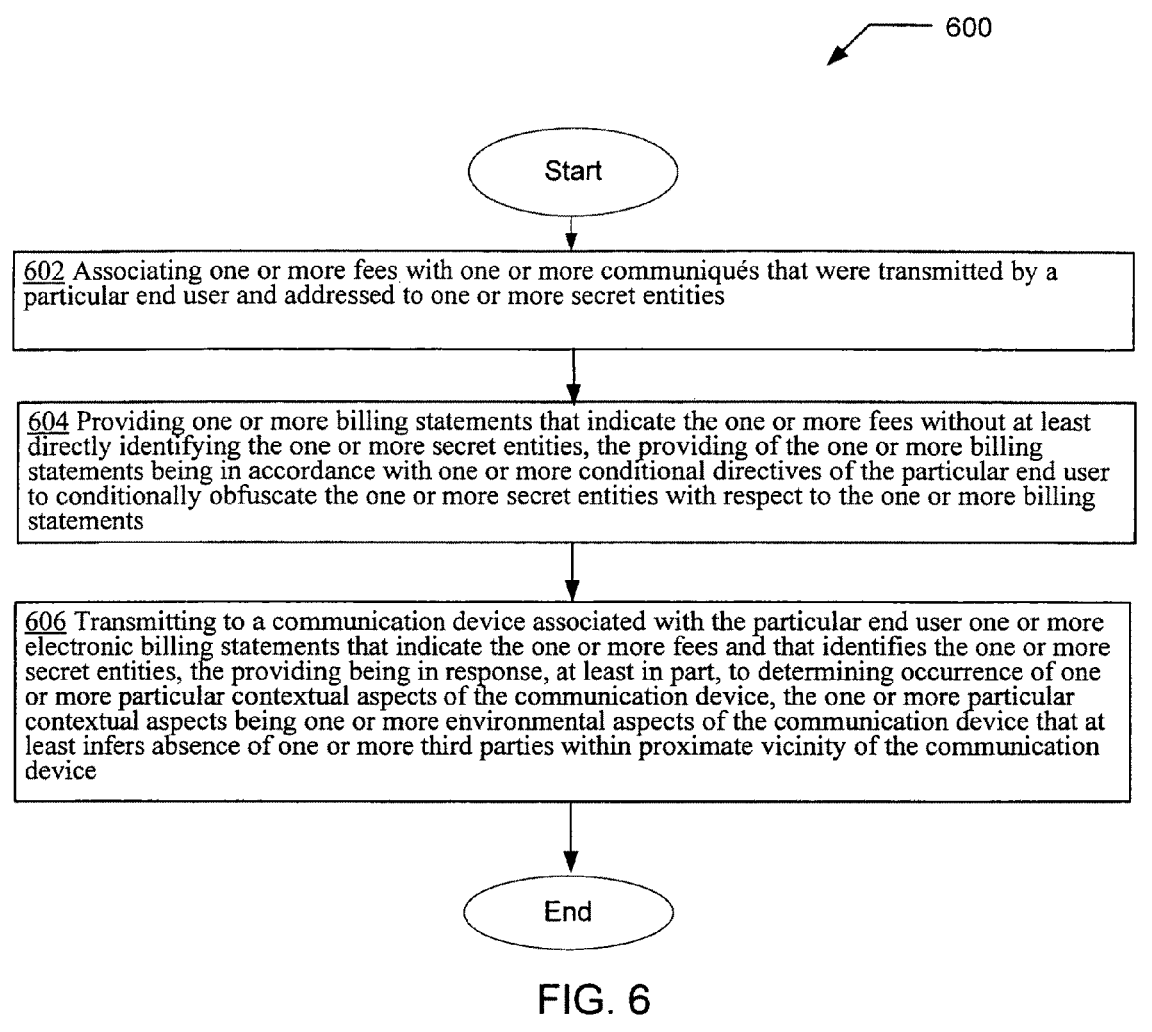

600

Start

602 Associating one or more fees with one or more communiqués that were transmitted by a particular end user and addressed to one or more secret entities 604 Providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements 606 Transmitting to a communication device associated with the particular end user one or more electronic billing statements that indicate the one or more fees and that identifies the one or more secret entities, the providing being in response, at least in part, to determining occurrence of one or more particular contextual aspects of the communication device, the one or more particular contextual aspects being one or more environmental aspects of the communication device that at least infers absence of one or more third parties within proximate vicinity of the communication device End

FIG. 6

CONDITIONALLY OBFUSCATING ONE OR MORE SECRET ENTITIES WITH RESPECT TO ONE OR MORE BILLING STATEMENTS RELATED TO ONE OR MORE COMMUNIQUÉS ADDRESSED TO THE ONE OR MORE SECRET ENTITIES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/228,664, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/228,873, entitled SYSTEM AND METHOD FOR TRANSMITTING ILLUSORY AND NON-ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 15, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,268, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 7, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/454,113, entitled SYSTEM AND METHOD FOR MODIFYING ILLUSORY USER IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 12, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/799,794, entitled SYSTEM AND METHOD FOR CONDITIONALLY TRANSMITTING ONE OR MORE LOCUM TENENTES, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Apr. 29, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,139, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,136, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,863, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 14, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,922, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 15, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,765, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jul. 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,832, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jul. 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,677, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 17, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,738, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 18, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/807,700, entitled CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Sep. 9, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/807,701, entitled CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Sep. 10, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/924,992, entitled CONDITIONALLY RELEASING A COMMUNIQUÉ DETERMINED TO BE AFFILIATED WITH A PARTICULAR SOURCE ENTITY IN RESPONSE TO DETECTING OCCURRENCE OF ONE OR MORE ENVIRONMENTAL ASPECTS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 8, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/925,014, entitled CONDITIONALLY RELEASING A COMMUNIQUÉ DETERMINED TO BE AFFILIATED WITH A PARTICULAR SOURCE ENTITY IN RESPONSE TO DETECTING OCCURRENCE OF ONE OR MORE ENVIRONMENTAL ASPECTS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 12, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/927,500, entitled CONDITIONALLY OBFUSCATING ONE OR MORE SECRET ENTITIES WITH RESPECT TO ONE OR MORE BILLING STATEMENTS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Nov. 15, 2010 which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/927,555, entitled CONDITIONALLY OBFUSCATING ONE OR MORE SECRET ENTITIES WITH RESPECT TO ONE OR MORE BILLING STATEMENTS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Nov. 16, 2010 which is currently co-pending or is an application of which a currently co-pending application is entitled to the benefit of the filing date.

For purposes of the USPTO extra-statutory requirements, the present application constitutes a continuation of U.S. patent application Ser. No. 12/927,791, entitled CONDITIONALLY OBFUSCATING ONE OR MORE SECRET ENTITIES WITH RESPECT TO ONE OR MORE BILLING STATEMENTS RELATED TO ONE OR MORE COMMUNIQUÉS ADDRESSED TO THE ONE OR MORE SECRET ENTITIES, naming Alexander J. Cohen; Edward K. Y. Jung; Royce A. Levien; Robert W. Lord; Mark A. Malamud; William H. Mangione-Smith; John D. Rinaldo, Jr. and Clarence T.

Tegreene as inventors, filed Nov. 22, 2010, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to associating one or more fees with one or more communiqués that were transmitted by a particular end user and addressed to one or more secret entities; and providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for associating one or more fees with one or more communiqués that were transmitted by a particular end user and addressed to one or more secret entities; and means for providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements. In addition to the foregoing, other system aspects are described in the claims, drawings, and text forming a part of the present disclosure.

A computationally implemented system includes, but is not limited to: circuitry for associating one or more fees with one or more communiqués that were transmitted by a particular end user and addressed to one or more secret entities; and circuitry for providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements. In addition to the foregoing, other system aspects are described in the claims, drawings, and text forming a part of the present disclosure.

An article of manufacture comprising a signal-bearing non-transitory storage medium bearing one or more instructions for associating one or more fees with one or more communiqués that were transmitted by a particular end user and addressed to one or more secret entities; and one or more instructions for providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements. In addition to the foregoing, other computer program product aspects are described in the claims, drawings, and text forming a part of the present disclosure.

A method for conditionally obfuscating one or more secret entities with respect to one or more billing statements, the method includes associating one or more fees with one or more communiqués that were transmitted by a particular end user and addressed to one or more secret entities; and providing, by a computing system, one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 is another high-level logic flowchart of another process.

DETAILED DESCRIPTION

Figure 1A:
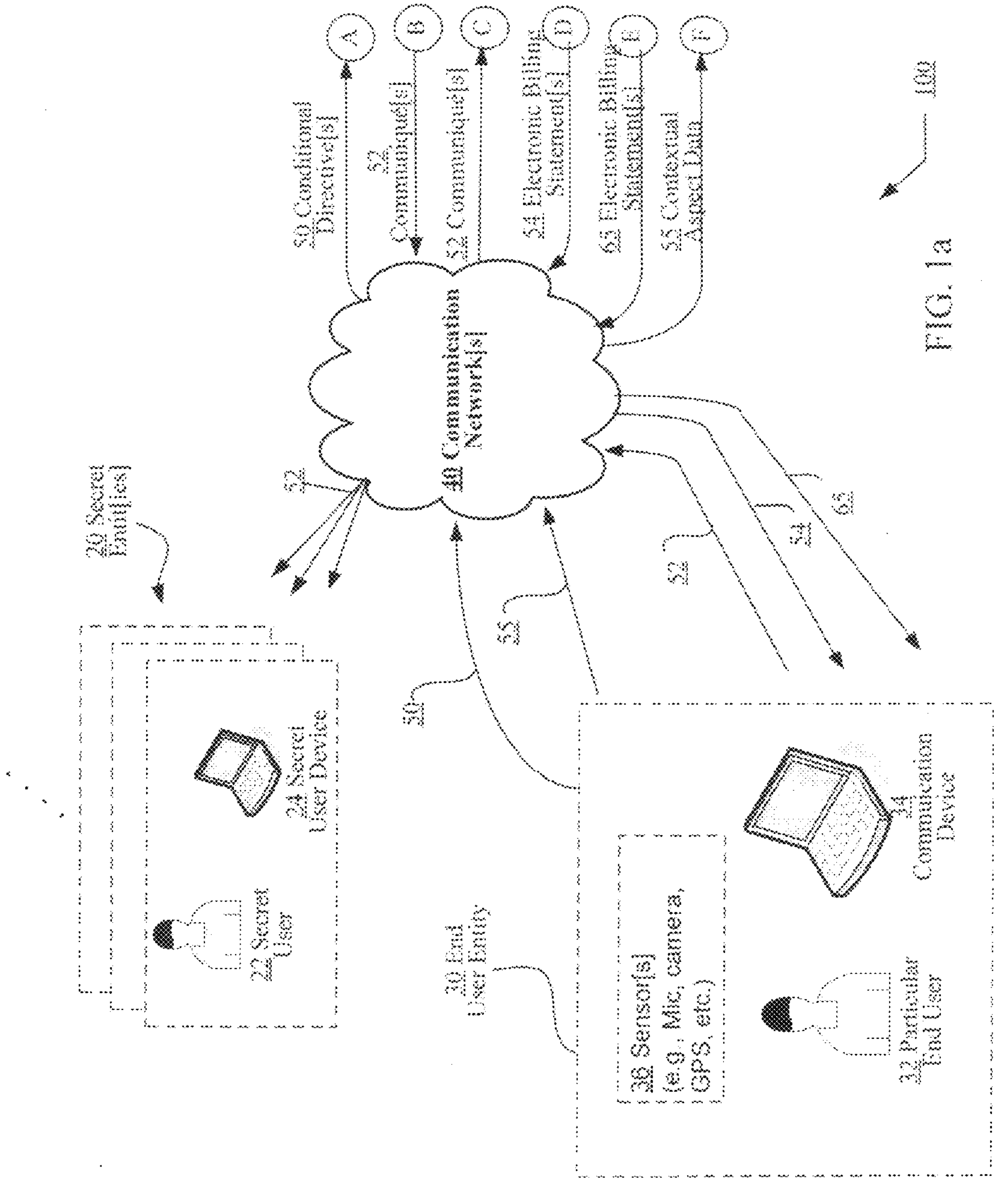
FIGS. 1*a* and 1*b* show a high-level block diagram of a computing system 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In recent years, the computing/communication industry has enjoyed dramatic technological advancement and spectacular commercial popularity, providing numerous benefits for those who have chosen to take advantage of such technological advancements. For example, with the rapid development of personal communication devices such as cellular telephones, personal digital assistants (PDAs), Smartphones, laptop computers, desktop computers, and so forth, users of such devices are now able to maintain 24/7 connectivity with other users at relatively low costs. Such connectivity may be via a variety of communication channels including, for example, telephone calls, emails, Voice over Internet Protocol (VoIP) calls, text messaging (e.g., short message service or SMS, or multimedia messaging service or MMS), instant messaging (IM), and so forth. Unfortunately, in addition to providing significant benefits to users, users of such technologies must also deal with a whole new slate of issues and problems that have also arisen with these new technologies.

For example, users of such personal communication devices (e.g., cellular telephones, Smartphones, laptop and desktop computers, and so forth) face a number of privacy and security issues. One such issue that has arisen with the use of such personal communication devices is that communiqués (e.g., electronic communications including, for example, telephone calls, VoIP, emails, text messages, IMs, and so forth) transmitted and/or received through such devices are sometimes accessible by those other than the primary users (e.g., owners) of such devices. As a result, highly sensitive communiqués (e.g., confidential personal or business communiqués), as well as information that indicates various aspects (e.g., originating source) of such communiqués, may often be accessed by others potentially causing embarrassing if not devastating consequences.

For example, it was extensively reported recently that a well-known and well-admired professional athlete was discovered having an extramarital affair by his spouse. It was widely reported that the spouse discovered this affair when she found a voice message from her husband's mistress on her husband's cellular telephone. Because the husband (i.e., famous professional athlete) in that incident had not erased or was not able to hide or disguise the voice message from his mistress, the husband had to endure considerable public humiliation and substantial financial loss due to loss of commercial endorsement income.

Such unfortunate results may also occur when one or more third parties have access to communication billing statements for communiquéservices (e.g., electronic communication services such as telephonic services) used by an end user. That is, some communication billing statements (e.g., telephone billing statements, which may be in paper form or in electronic form) will often contain important information related to outgoing communiqués (as well as incoming communiqués) including, for example, information about when outgoing communiqués were sent out or transmitted, and information directly identifying the names, addresses (e.g., email addresses), and/or telephone numbers associated with the destinations of the outgoing communiqués. When viewed by a third party, such information may help the third party to easily determine who the end user has been transmitting communiqués to (e.g., whom has the end user been communicating with). An example of such a billing statement is a telephone billing statement that will have a listing of all incoming as well as outgoing calls. Such a statement will typically indicate, for example, the dialed telephone number of an outgoing call as well as in some cases, the name associated with the dialed number. Such information if viewed by a third party may potentially result in devastating consequences.

Of course the need to maintain communication secrecy is not just limited to personal situations, but may also be necessary in professional/business context. For example, it may be inappropriate for a person to receive certain sensitive communiqués from particular parties (e.g., communiqués from certain clients or competitors, or communiqués from a particular website or business) while at work or while at other locations (e.g., when meeting with clients).

According to various embodiments, methods, systems, and computer program products are provided for conditionally obfuscating one or more secret entities with respect to one or more billing statements that indicates one or more fees associated with one or more communiqués that were transmitted by a particular end user and addressed to one or more secret entities. In some embodiments, the conditional obfuscation of the one or more secret entities (e.g., one or more entities that the particular end user wishes to conceal or hide from, for example, one or more third parties) with respect to the one or more billing statements may involve conditionally obfuscating the one or more secret entities with respect to the one or more billing statements (e.g., electronic billing statements) when certain predefined environmental conditions of a communication device associated with the end user have been detected. In some embodiments, the conditional obfuscation of the one or more secret entities with respect to the one or more billing statements may involve conditionally replacing one or more representations (e.g., identifiers including names, email addresses, telephone numbers, etc.) of the secret entities included in the one or more billing statements with one or more locum tenentes (e.g., obfuscating substitutes or replacements).

As will be further described herein, the methods, systems, and computer program products may be implemented by a computing system such as a network computing system, which may comprise of one or more network servers. Note that for purposes of this description, and unless indicated otherwise, the term "network server" may be broadly interpreted and may be in reference to a wide variety of network devices designed to facilitate in the transmission, directing, processing, routing, relaying, and/or storing of communiqués including, for example, routers, switches, telephone exchanges, storage devices, and so forth.

For purposes of the following description, a "communiqué" may be in reference to any one of a variety of electronic communication means including, for example, a visual textual communiqué such as an email message, a text message (e.g., short message service "SMS" or multimedia messaging service "MMS"), an instant message (IM), and so forth, or an audio communiqué such as a telephonic communiqué (e.g., a telephone call, a Voice over Internet Protocol or VoIP call, a voice message, a video call or message, and so forth).

As will be further described herein, a "secret entity" may be in reference to any entity that an end user, for example, wishes to conceal or hide (e.g., to obfuscate its identity or to obfuscate a communiqué's affiliation with the secret entity). In some cases, a secret entity may include, for example, a secret user who may be a human or robotic user and/or a secret user device such as a cellular telephone, Smartphone, laptop or desktop computer, a workstation, and so forth. In some cases, a secret entity may be an organization such as a business or a trade or interest group. In some instances, a source entity may be a website.

For purposes of the following description, an "end user" may be any user who is able to transmit and/or receive communiqués using, for example, one or more communication devices and who may wish to conceal or hide the existence or identity of a secret entity that the end user corresponds with. In some cases, an end user may obtain electronic billing statements for communiquéservices (e.g., telephonic services) via the one or more communication devices. A communication device may be any type of computing device that is designed to transmit/receive communiqués including, for example, a cellular telephone, a Smartphone, a personal digital assistant (PDA), a landline telephone, a laptop or desktop computer, a tablet computer, a workstation, and so forth.

A "conditional directive," as will be discussed herein, may relate to a command or instruction to execute one or more tasks when, for example, one or more conditions have occurred and/or detected. For example, a conditional directive, which may be provided by a particular end user, may identify the one or more environmental conditions (e.g., environmental conditions of a communication device associated with the end user) that when detected may direct or instruct obfuscation of one or more secret entities in one or more billing statements that indicate one or more fees associated with one or more communiqués that were transmitted by the particular end user and addressed to the one or more secret entities. In some cases, a conditional directive may additionally or alternatively identify one or more environmental conditions (e.g., environmental conditions of the communication device associated with the particular end user) that when detected may direct or instruct obfuscation of the one or more secret entities with respect to the one or more communiqués that were transmitted by the particular end user and addressed to the one or more secret entities.

In the following, a "communiqué" may be in reference to any one of a wide variety of electronic communications including, for example, a telephonic communiqué (e.g., telephonic communication) such as a cellular or landline telephone call, voice over Internet Protocol (VoIP) call, a voice message, a video call or message, and so forth, or a textual communiqué (e.g., a textual communication) such as an email, an instant message (IM), a text message, and so forth.

Figure 1B:
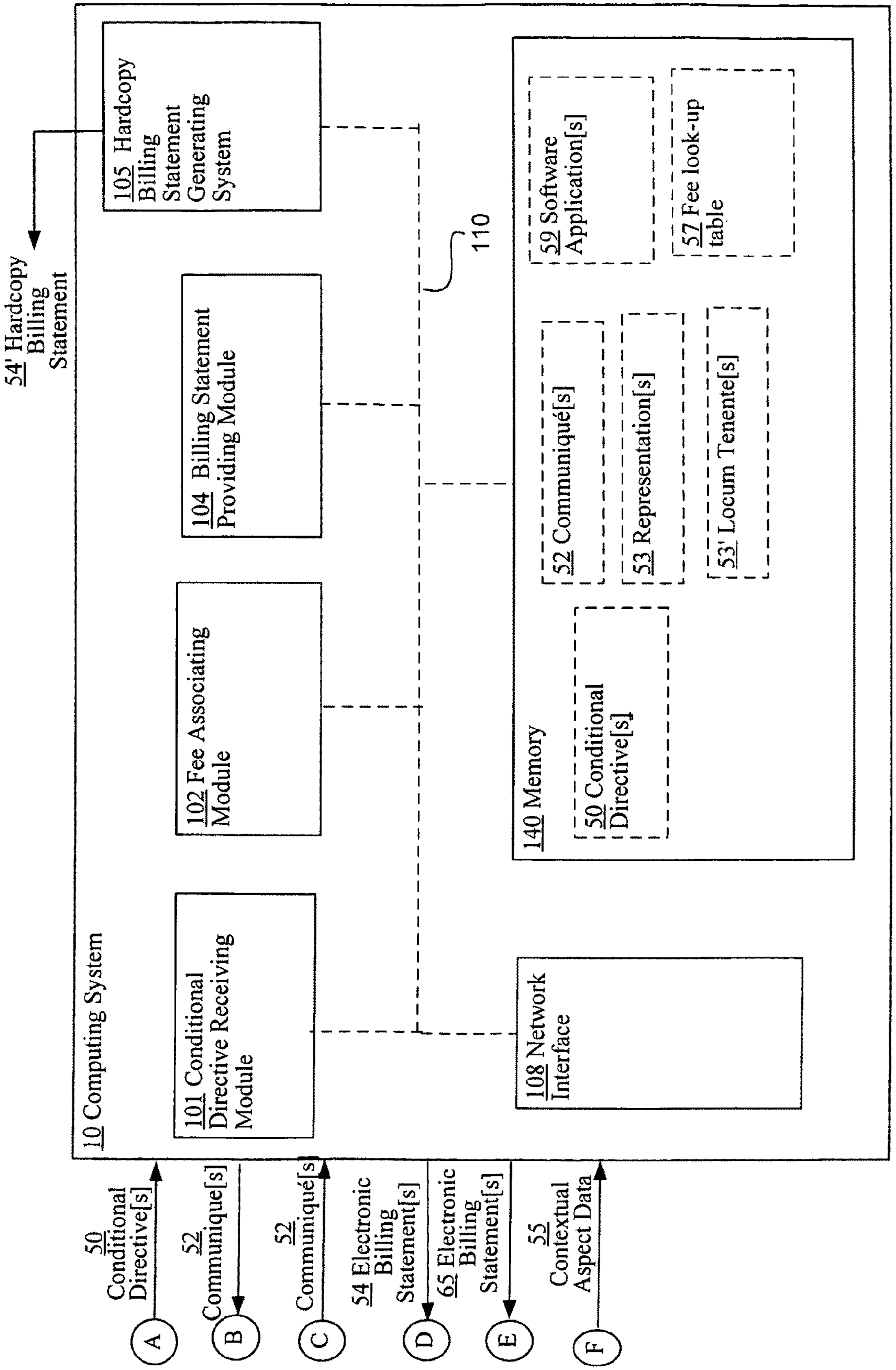

Turning now to FIGS. 1*a*, and 1*b* illustrating an example environment 100 in which the methods, systems, circuitry, and computer program products in accordance with various embodiments may be implemented by or at a computing system 10. Among other things, the methods, systems, circuitry, and computer program products implemented by the computing system 10 may be designed to associate one or more fees with one or more communiqués 52 that were transmitted by a particular end user 32 and addressed to (e.g., being transmitted to or sent to) one or more secret entities 20; and to provide one or more billing statements 54* that indicate the one or more fees without at least directly identifying the one or more secret entities 20, the providing of the one or more billing statements 54* being in accordance with one or more conditional directives 50 of the particular end user 32 to conditionally obfuscate the one or more secret entities 20 with respect to the one or more billing statements 54*. Note that "*" represents a wildcard. Thus, references to the "one or more billing statements 54*" in the following may be in reference to one or more electronic billing statements 54 and/or one or more hardcopy billing statements 54'.

In various embodiments, the computing system 10 may be a network system located at a single network site or located at multiple network sites such as in the case of cloud computing. In some embodiments, the computing system 10 may include one or more network servers including one or more telephone switches, one or more telephone exchanges, and/or one or more routers. For these embodiments, the computing system 10 may comprise of multiple network components such as in the case of cloud computing. In some cases, the computing system 10, in addition to being able to associate the one or more fees with the one or more communiqués 52, and to provide the one or more billing statements 54* that indicate the one or more fees without at least directly identifying the one or more secret entities 20, may also be designed to facilitate relaying of one or more communiqués 52* between various parties including between an end user entity 30 (e.g., an end user entity 30 that includes at least a particular end user 32 and a communication device 34) and one or more secret entities 20 via one or more communication networks 40. The one or more communication networks 40 may comprise of one or more of a local area network (LAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

As illustrated in FIG. 1*a*, a secret entity 20 may comprise of a secret user 22 and/or a secret user device 24 (e.g., a laptop computer, a desktop computer, a workstation, a Smartphone, a cellular telephone, a personal digital assistant (PDA), or other computing/communication devices). From another perspective, a secret entity 20 may be a website or an organization such as a business, a social group, a trade/technical group, or an interest group. Note that FIG. 1*a* illustrates a plurality of secret entities 20 that a particular end user 32, for example, may wish to conceal from one or more third parties.

As further illustrated in FIG. 1*a*, an end user entity 30 may comprise a particular end user 32, a communication device 34 (e.g., a laptop computer, a workstation, a Smartphone, a PDA, a desktop computer, a cellular telephone, and so forth), and one or more sensors 36 (e.g., a microphone, a webcam, a digital camera, a global positioning system (GPS), and so forth). In some cases, the one or more sensors 36 may be integrated into the communication device 34, while in other cases, the one or more sensors 36 may be discrete devices from the communication device 34 (e.g., devices that are not integrated into the communication device 34).

In various embodiments, the computing system 10 may be designed to directly or indirectly receive from the end user entity 30 one or more conditional directives 50. For these embodiments, the one or more conditional directives 50 may be received from the end user entity 30 via, for example, the one or more communication networks 40. The one or more conditional directives 50 that may be received may direct (e.g., instruct) conditional obfuscation (e.g., conditional concealment) of one or more secret entities 20 with respect to one or more billing statements 54* that indicate one or more fees associated with one or more communiqués 52 that were transmitted by the end user entity 30 (e.g., transmitted by a particular end user 32) and addressed to the one or more secret entities 20. As will be further described herein, the conditional directives 50 that may be received from the particular end user 32 may, in some cases, identify the specific contextual aspects (e.g., environmental conditions of a communication device 34 associated with the particular end user 32) that when detected may prompt the obfuscation of the one or more secret entities 20 with respect to the one or more billing statements 54*. In some cases, the one or more conditional directives 50 may be solicited from the particular end user 32.

For the embodiments, the computing system 10 may be designed to receive (e.g., relay) one or more communiqués 52 (e.g., one or more telephonic communications and/or one or more textual communications) transmitted by a particular end user 32 (e.g., end user entity 30) and addressed to (e.g., transmitted to or directed to) one or more secret entities 20. In some embodiments, the computing system 10, in addition to being designed to receive the one or more communiqués 52, may be designed to associate one or more fees with the one or more received communiqués 52 transmitted by the particular end user 32 and addressed to the one or more secret entities 20. The one or more fees that may be associated with one or more communiqués 52 may have been found on a look-up table and/or may have been calculated. In some embodiments, such fees may be for providing general communiqué services and/or providing obfuscation services (e.g., obfuscating the one or more secret entities 20 with respect to communiqués 52 and/or with respect to billing statements **54*/65**).

As also alluded to earlier, in various embodiments, the computing system 10 of FIG. 1*b* may also be designed to provide one or more billing statements 54* that indicate the one or more fees without at least directly identifying the one or more secret entities 20, the providing of the one or more billing statements 54* being in accordance with one or more conditional directives 50 of the particular end user 32 to conditionally obfuscate the one or more secret entities 20 with respect to the one or more billing statements 54*. The one or more billing statements 54* to be provided may be one or more electronic billing statements 54 which may be transmitted to the particular end user 32 (e.g., end user entity 30) and/or one or more hardcopy billing statements 54 (e.g., paper billing statements).

Since it may generally be difficult to control who has access to hardcopy billing statements 54', the default for the computing system 10 is that whenever one or more hardcopy billing statements 54' are to be provided only hardcopy billing statements 54' that do not identify the one or more secret entities 20 may be provided. In various embodiments, when one or more hardcopy billing statements 54' are indeed to be provided, the one or more hardcopy billing statements 54' may or may not be generated by the computing system 10. That is, in some implementations, the computing system 10 may merely prompt an external device (e.g., the hardcopy billing statement generating system 105 of FIG. 1*b*, which may or may not be part of the computing system 10) to generate the one or more hardcopy billing statements 54'.

If one or more electronic billing statements 54 that indicate the one or more fees and that does not identify the one or more secret entities 20 are to be provided (e.g. have been requested) then the one or more electronic billing statements 54 may be conditionally transmitted to the end user entity 30 (e.g., communication device 34) only when one or more particular contextual aspects (e.g., particular environmental conditions) associated with the communication device 34 associated with the particular end user 32 have occurred and/or have been detected. As a result, in some embodiments, the computing system 10 may transmit the one or more electronic billing statements 54 to the end user entity 30 (e.g., communication device 34 of the particular end user 32) only after determining at least occurrence of one or more particular contextual aspects associated with the communication device 34 of the particular end user 32.

The one or more particular contextual aspects referred to above may be one or more environmental aspects of the communication device 34 that when detected at least infers presence of one or more third parties (either specific third parties or any random third parties) within proximate vicinity of the communication device 34. Examples of contextual aspects that may infer the presence of one or more third parties within proximate vicinity of the communication device 34 includes, for example, the communication device 34 having reached one or more specified points or intervals of time (e.g., between 9 AM and 5 PM when the particular end user 32 is at work), the communication device 34 being at one or more specified locations (e.g., when the communication device 34 is at the workplace of the particular end user 32), and/or determining the existence of one or more environmental audio and/or visual indicators (e.g., audio indications of one or more third parties and/or visual images of one or more third parties that were recorded/sensed by the communication device 34) that infers that one or more third parties are within proximate vicinity of the communication device 34 of the particular end user 32. The phrase “within proximate vicinity of the communication device 34” is repeatedly used herein and may be in reference to the immediate surrounding area around the communication device 34 from which a third party may be able to see, hear, and/or sense a billing statement 54 being presented through the communication device 34. In some cases, this may mean within 5 feet, within 10 feet, within 30 feet, or within any other distances from which a third party can see, hear, and/or sense a billing statement 54 being presented through the communication device 34.

The determination as to whether the one or more particular contextual aspects associated with the communication device 34 have occurred (which may prompt the transmission of the electronic billing statement 54 that does not indicate the one or more secret entities 20 to the communication device 34) may be based on contextual aspect data 55 provided by the end user entity 30 (e.g., provided by the communication device 34 of the particular end user 32) that may infer that one or more third parties (e.g., one or more specific third parties or any one or more third parties) are or are not within proximate vicinity of the communication device 34. The contextual aspect data 55 that may be provided by the end user entity 30

(e.g., provided by the communication device 34 and/or one or more sensors 36) may include, for example, data that indicates the relative time of the communication device 34, data that indicates the location or locations of the communication device 34, and/or data that indicates one or more environmental (audio and/or image) indicators that infers the presence or absence of one or more third parties within proximate vicinity of the communication device 34. The contextual aspect data 55 provided may include, in various embodiments, sensor provided data such as global positioning system (GPS) provided data, data provided by an image capturing device such as a webcam or digital camera, and/or data provided by an audio capturing device such as a microphone. Note that for purposes of this description, the term "GPS" may be in reference to a wide variety of location determining devices including conventional GPS devices that rely on satellite signals as well as triangulation devices that rely on cellular signals in order to determine relative locations.

In some cases, the contextual aspect data 55 provided by the end user entity 30 may include log entry data that may have been entered by the particular end user 32 using, for example, a personal management application (e.g., Microsoft Outlook) and/or social networking application (e.g., a Twitter application or a Facebook application). Such log entry data may include data that indicates (e.g., infers) when one or more third parties are within the proximate vicinity of the communication device 34 of the particular end user 32.

The computing system 10 may obfuscate the one or more secret entities 20 with respect to the one or more billing statements 54* in a number of ways in various alternative embodiments. For example, in some embodiments, the computing system 10 in order to provide for the one or more billing statements 54*, may be designed to replace one or more representations (e.g., telephone numbers, names, email addresses, and so forth) of the one or more secret entities 20 with one or more locum tenentes 53' (e.g. obfuscating substitutes or placeholders such as illusory names, illusory addresses, illusory telephone numbers, and so forth) in the one or more billing statements 54* to be provided. In some cases, the one or more locum tenentes that may be inserted into the one or more billing statements 54* may have been provided by the particular end user 32 via the, for example, one or more conditional directives 50. In other embodiments, however, the one or more secret entities 20 may be obfuscated with respect to the one or more billing statements 54* by simply removing (e.g., deleting) all representations (e.g., names, telephone numbers, and/or addresses) of the one or more secret entities 20 included in the one or more billing statements 54* without replacing them.

Note that if one or more electronic billing statements 54 (e.g., the one or more electronic billing statements 54 that at least does not directly identify the one or more secret entities 20) are to be provided (e.g., transmitted) then the one or more electronic billing statements 54 may be provided in accordance with one or more conditional directives 50 of the particular end user 32 that directs obfuscating of the one or more secret entities 20 with respect to the one or more electronic billing statements 54 when one or more specified conditions have at least occurred. In some embodiments, such specified conditions may include, for example, the communication device 34 of the particular end user 32 having reached one or more specified points or intervals of time, the communication device 34 being at one or more specified locations, and/or when one or more third parties (e.g., either one or more specified third parties as specified by the one or more conditional directives 50 or any one or more random third parties) are in the proximate vicinity of the communication device 34.

In addition to being designed to provide the one or more billing statements 54* (e.g., billing statements that do not at least directly identify the one or more secret entities 20), the computing system 10 may be designed to transmit to the communication device 34 associated with the particular end user 32 one or more electronic billing statements 65 that indicate the one or more fees and that identifies (e.g., directly indicates) the one or more secret entities 20, the providing being in response, at least in part, to determining occurrence of one or more particular contextual aspects (e.g., environmental aspects) of the communication device 34 that at least infers absence of one or more third parties within proximate vicinity of the communication device 34. For example, if the computing system 10 determines that the communication device 34 of the particular end user 32 has reached one or more specified times (e.g., 8 PM to 6 AM when the particular end user 32 will likely be at home), determines that the communication device 34 is at one or more specified locations (e.g., the communication device 34 is at the home residence of the particular end user 32), and/or determining that one or more third parties are not within proximate vicinity of the communication device 34 based on sensor provided data or based on log entry data, then the computing system 10 may transmit the one or more electronic billing statements 65 to the communication device 34.

Turning specifically now to the computing system 10 of FIG. 1*b*. The computing system 10, as depicted, may include a variety of modules, sub-modules, and various other components. The computing system 10, in some embodiments, may be a single network device such as a single server, which may be a single router, a single telephone switch, or some other network device located at a single network site. Alternatively, the computing system 10 may be a collection of network component devices including a collection of servers located at one network site or located at multiple network sites such as the case in cloud computing. Thus, the computing system 10 may be implemented at a single network site or at multiple network sites using a single server or multiple servers. Note that for ease of illustration and explanation, the computing system 10 that is illustrated in FIG. 1*b* is depicted as a single server device. However, and as indicated earlier, the computing system 10 may be a network system that may be implemented using, for example, multiple network servers such as in the case of cloud computing.

Figure 2A:
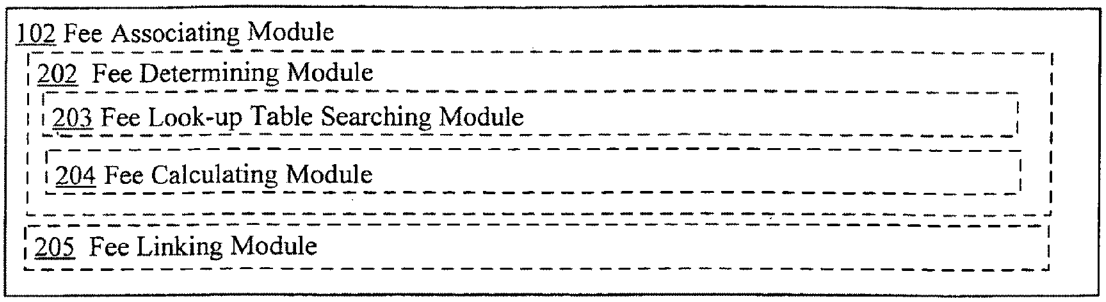
FIG. 2*a* shows another perspective of the fee associating module 102 of the computing system 10 of FIG. 1*b*.
Figure 2B:
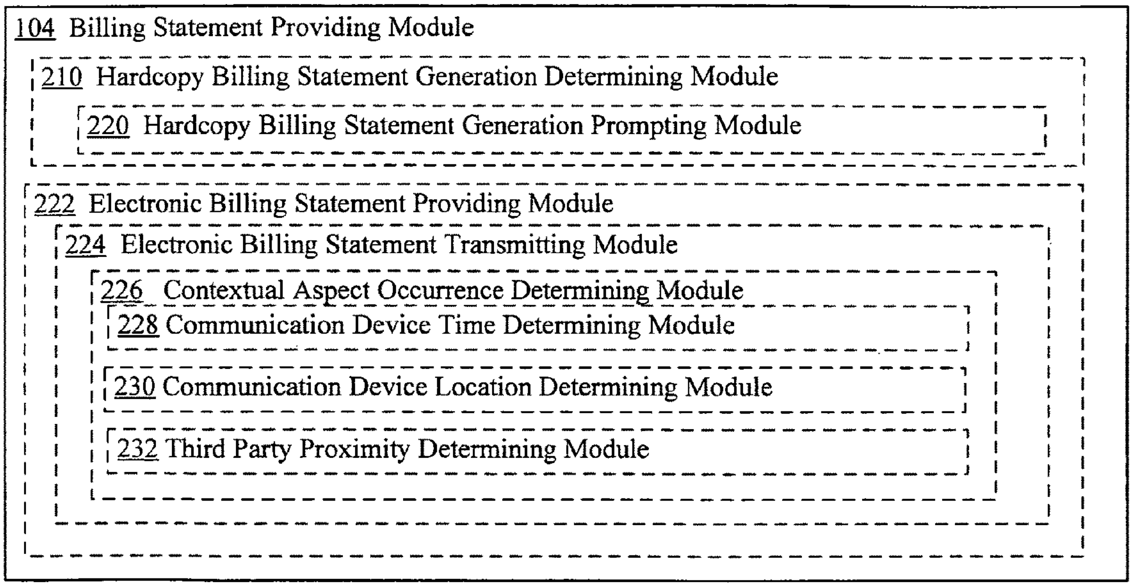
FIG. 2*b* shows another perspective of the billing statement providing module 104 of the computing system 10 of FIG. 1*b*.
Figure 2C:
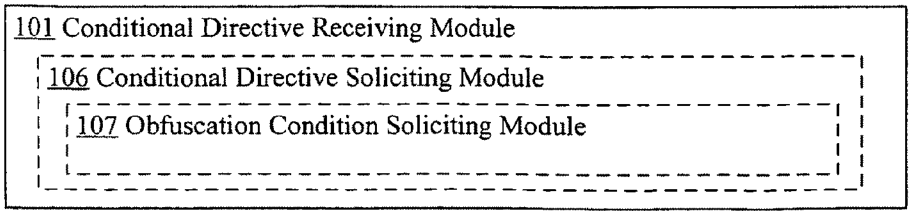
FIG. 2*c* shows another perspective of the conditional directive receiving module 101 of the computing system 10 of FIG. 1*b*.

In various embodiments, the computing system 10 may include one or more logic modules including at least a fee associating module 102 (which may further include one or more sub-modules as illustrated in FIG. 2*a*) and a billing statement providing module 104 (which may further include one or more sub-modules as illustrated in FIG. 2*b*). For these embodiments, the computing system 10 may also optionally include other logic modules including a conditional directive receiving module 101 (which may further include one or more sub-modules as illustrated in FIG. 2*c*). In addition, the computing system 10, in some embodiments, may further include other components including a network interface 108 (e.g., network interface card or NIC), a memory 140, and/or a hardcopy billing statement generating system 105 (for generating hardcopy billing statements 54').

In brief, the fee associating module 102 may be configured to associate one or more fees with one or more communiqués 52 that were transmitted by a particular end user 32 and that were addressed to one or more secret entities 20. On the other hand, the billing statement providing module 104 may be configured to provide one or more billing statements 54* that indicate the one or more fees without at least directly identifying the one or more secret entities 20, the providing of the one or more billing statements 54* being in accordance with one or more conditional directives 50 of the particular end user 32 to conditionally obfuscate the one or more secret entities 20 with respect to the one or more billing statements 54*. The conditional directive receiving module 101 may be configured to receive one or more conditional directives 50 from an end user entity 30 (e.g. a particular end user 32 of the end user entity 30 via, for example, the communication device 34). Note that a more detailed discussion related to the fee associating module 102, the billing statement providing module 104, the conditional directive receiving module 101, and all their sub-modules (e.g., as illustrated in FIGS. 2*a*, 2*b*, and 2*c*) will be provided below with respect to the operations and processes to be described herein.

Although not depicted, the computing system 10 may also include other components such as one or more processors (e.g., microprocessors) and one or more user interfaces. In various embodiments, the various logic modules depicted as being included in the computing system 10 of FIG. 1*b* including, for example, the fee associating module 102, the billing statement providing module 104, the conditional directive receiving module 101, and their sub-modules (as depicted in FIGS. 2*a* and 2*b*), may be implemented using hardware (e.g., circuitry), software, firmware, or any combination thereof.

For example, in some embodiments, the fee associating module 102, the billing statement providing module 104, and the conditional directive receiving module 101 (and their sub-modules as depicted in FIGS. 1*b*, 2*a*, 2*b*, and 2*c*) may be implemented using hardware such as specially designed circuitry including, for example, application specific integrated circuit or ASIC. Alternatively, the fee associating module 102, the billing statement providing module 104, and the conditional directive receiving module 101 (and their sub-modules) may be embodied in software in the form of computer readable instructions that may be executed using one or more processors as will be further described below with respect to FIG. 9.

In still other embodiments, the fee associating module 102, the billing statement providing module 104, and the conditional directive receiving module 101 (and their sub-modules) may be implemented using a combination of hardware and software such as when the fee associating module 102, the billing statement providing module 104, and the conditional directive receiving module 101 (and their sub-modules) are implemented using Field Programmable Gate Arrays or FPGAs. Note that FIG. 1*b* depicts the hardware implementation of the computing system 10. That is, for ease of illustration, the fee associating module 102, the billing statement providing module 104, and the conditional directive receiving module 101 that are illustrated in FIG. 1*b* are each depicted as being implemented by ASIC-type circuitry that along with the network interface 108 and the memory 140 may be coupled together by, for example, a bus 110.

Again, note that for ease of illustration and understanding, FIG. 1*b* illustrates a single device embodiment of the computing system 10 (e.g., meaning that the computing system 10 depicted in FIG. 1*b* is depicted as being embodied in a single network component device such as a single server rather than being embodied by multiple servers as in the case of cloud computing). However, those having ordinary skill in the art will recognize that the computing system 10 may be implemented using multiple network component devices (e.g., multiple servers) located at multiple network sites such as in the case in cloud computing.

Further note again that although FIG. 1*b* illustrates only the hardware embodiment of the computing system 10, those having ordinary skill in the art will recognize the fee associating module 102, the billing statement providing module 104, and the conditional directive receiving module 101 (and their sub-modules as illustrated in FIGS. 1*b*, 2*a* and 2*b*) may also be embodied in software or firmware that may be executed using one or more processors, or may be implemented using any combination of hardware, software, and firmware. Further, one or more of the logic modules of the computing system 10 including the fee associating module 102, the billing statement providing module 104, and the conditional directive receiving module 101 (and their sub-modules) as well as memory 140 may be located at different network sites as is the case in cloud computing.

In various embodiments, and as previously alluded to, the computing system 10 may include a memory 140 for storing various types of data. For these embodiments, memory 140 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 140 may be located at a single network site. Alternatively, memory 140 may be located at multiple network sites. In some embodiments, memory 140 may be located at the same network site that one or more of the logic modules (e.g., the fee associating module 102, the billing statement providing module 104, and/or the conditional directive receiving module 101) of the computing system 10 may be located at. Alternatively, memory 140 may be located at a separate network site from the network site where the one or more of the modules of the computing system 10 may be located.

The memory 140 may store a variety of data in various alternative embodiments. For example, in some embodiments, memory 140 among other things may store one or more conditional directives 50, one or more communiqués 52, one or more representations 53 (e.g., names, telephone numbers, email addresses, etc. of the one or more secret entities 20), one or more locum tenentes 53' for the one or more representations' 53, a fee look-up table 57, and/or one or more software applications 59. Examples of software applications 59 include applications that may be used in order to process contextual aspect data 55 that may be received from the communication device 34 and used to determine, for example, whether one or more third parties (e.g., specific third parties or any random third parties) are within or not within the proximate vicinity of the communication device 34 of the particular end user 32. Examples of such applications may include, for example, a facial recognition system application, a voice recognition system application, a personal management application, a social networking application, and so forth.

Referring now to FIG. 2*a* illustrating a particular implementation of the fee associating module 102 of FIG. 1*b*. As illustrated, the fee associating module 102 may include one or more logic sub-modules in various alternative implementations. For example, in various implementations, the fee associating module 102 may include a fee determining module 202 (which may further include a fee look-up table searching module 203 and/or a fee calculating module 204) and/or a fee linking module 205.

As alluded to earlier, each of the logic sub-modules of the fee associating module 102 may be implemented using hardware (e.g., circuitry), software (e.g., computer readable instructions executed by one or more processors), firmware, or any combination thereof. Specific details related to the fee associating module 102 as well as the above-described sub-modules of the fee associating module 102 will be provided below in reference to the operations and processes to be described herein.

Referring now to FIG. 2*b* illustrating a particular implementation of the billing statement providing module 104 of FIG. 1*b*. As illustrated, the billing statement providing module 104 may also include one or more logic sub-modules in various alternative implementations. For example, in some implementations, the billing statement providing module 104 may include a hardcopy billing statement generation determining module 210 (which may further include a hardcopy billing statement generation prompting module 220) and/or an electronic billing statement providing module 222. In implementations where the billing statement providing module 104 includes the electronic billing statement providing module 222, the electronic billing statement providing module 222 may include an electronic billing statement transmitting module 224 that may further include a contextual aspect occurrence determining module 226 (which may further include a communication device time determining module 228, a communication device location determining module 230, and/or a third party proximity determining module 232).

As previously alluded to, each of the logic sub-modules of the billing statement providing module 104 may be implemented using hardware (e.g., circuitry), software (e.g., computer readable instructions executed by one or more processors), firmware, or any combination thereof. Specific details related to the above-described sub-modules of the billing statement providing module 104 will be provided below in reference to the operations and processes to be described herein.

Referring now to FIG. 2*c* illustrating a particular implementation of the conditional directive receiving module 101 of FIG. 1*b*. As illustrated, the conditional directive receiving module 101 may also include one or more logic sub-modules in various alternative implementations. For example, in some implementations, the conditional directive receiving module 101 may include a conditional directive soliciting module 106, which may further include an obfuscation condition soliciting module 107. Each of the logic sub-modules of the conditional directive receiving module 101 may be implemented using hardware (e.g., circuitry), software (e.g., computer readable instructions executed by one or more processors), firmware, or any combination thereof. Specific details related to the above-described sub-modules of the conditional directive receiving module 101 will be provided below in reference to the operations and processes to be described herein.

Figure 3:
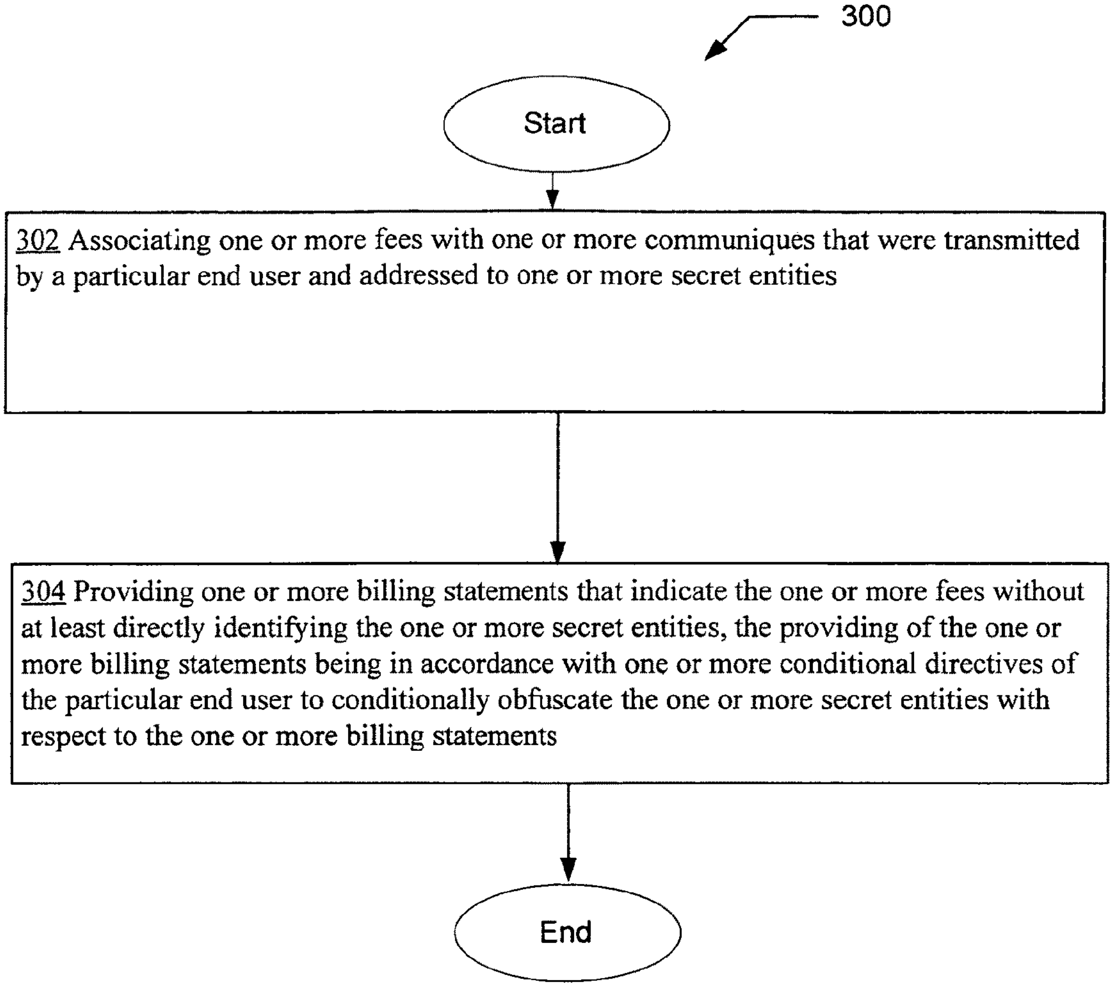
FIG. 3 is a high-level logic flowchart of a process.

A more detailed discussion related to the computing system 10 of FIG. 1*b* will now be provided with respect to the processes and operations to be described herein. FIG. 3 illustrates an operational flow 300 representing example operations for, among other things, conditional obfuscation of one or more secret entities with respect to one or more billing statements (e.g., to conditionally obfuscate one or more secret entities in one or more billing statements), the one or more billing statements indicating one or more fees associated with one or more communiqués that were transmitted by a particular end user and addressed to (e.g., directed to or transmitted to) one or more secret entities. In FIG. 3 and in the following figures that include various examples of operational flows, discussions and explanations will be provided with respect to the exemplary environment 100 described above and as illustrated in FIGS. 1*a* and 1*b*, and/or with respect to other examples (e.g., as provided in FIGS. 2*a*, 2*b*, 2*c*, and 9) and contexts. However, it should be understood that the operational flows may be executed in a number of other environments and contexts, and/or in modified versions of FIGS. 1*a*, 1*b*, 2*a*, 2*b*, 2*c*, and 9. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 3 as well as the other operations to be described herein may be performed by at least one of a machine, an article of manufacture, or a composition of matter.

In any event, after a start operation, the operational flow 300 of FIG. 3 may move to a fee associating operation 302 for associating one or more fees with one or more communiqués that were transmitted by a particular end user and addressed to one or more secret entities. For instance, and as an illustration, the fee associating module 102 of the computing system 10 of the example environment 100 of FIGS. 1*a* and 1*b* associating one or more fees with one or more communiqués 52 (e.g., electronic communications such as telephonic calls or messages, video calls, emails, and so forth) that were transmitted by a particular end user 32 and addressed to (e.g., directed to, transmitted to, or being sent to) one or more secret entities 20.

In addition to the fee associating operation 302, operational flow 300 may also include a billing statement providing operation 304 for providing one or more billing statements that indicate the one or more fees without at least directly identifying the one or more secret entities, the providing of the one or more billing statements being in accordance with one or more conditional directives of the particular end user to conditionally obfuscate the one or more secret entities with respect to the one or more billing statements as further illustrated in FIG. 3. For instance, the billing statement providing module 104 of the computing system 10 of FIG. 1*b* providing (e.g., generating, transmitting, and so forth) one or more billing statements 54*(e.g., one or more electronic billing statements 54 and/or one or more hardcopy billing statements 54') that indicate the one or more fees without at least directly identifying the one or more secret entities 20 (e.g., without providing any known identifiers of the secret entities 20 such as known addresses, telephone numbers, names, and so forth that could identify the one or more secret entities 20), the providing of the one or more billing statements 54* being in accordance with one or more conditional directives 50 of the particular end user 32 to conditionally obfuscate the one or more secret entities 20 with respect to the one or more billing statements 54*. Note again that "*" represents a wildcard and therefore, references to "billing statements 54*" will be in reference to electronic billing statements 54 and/or hardcopy billing statements 54'.

Figure 4A:
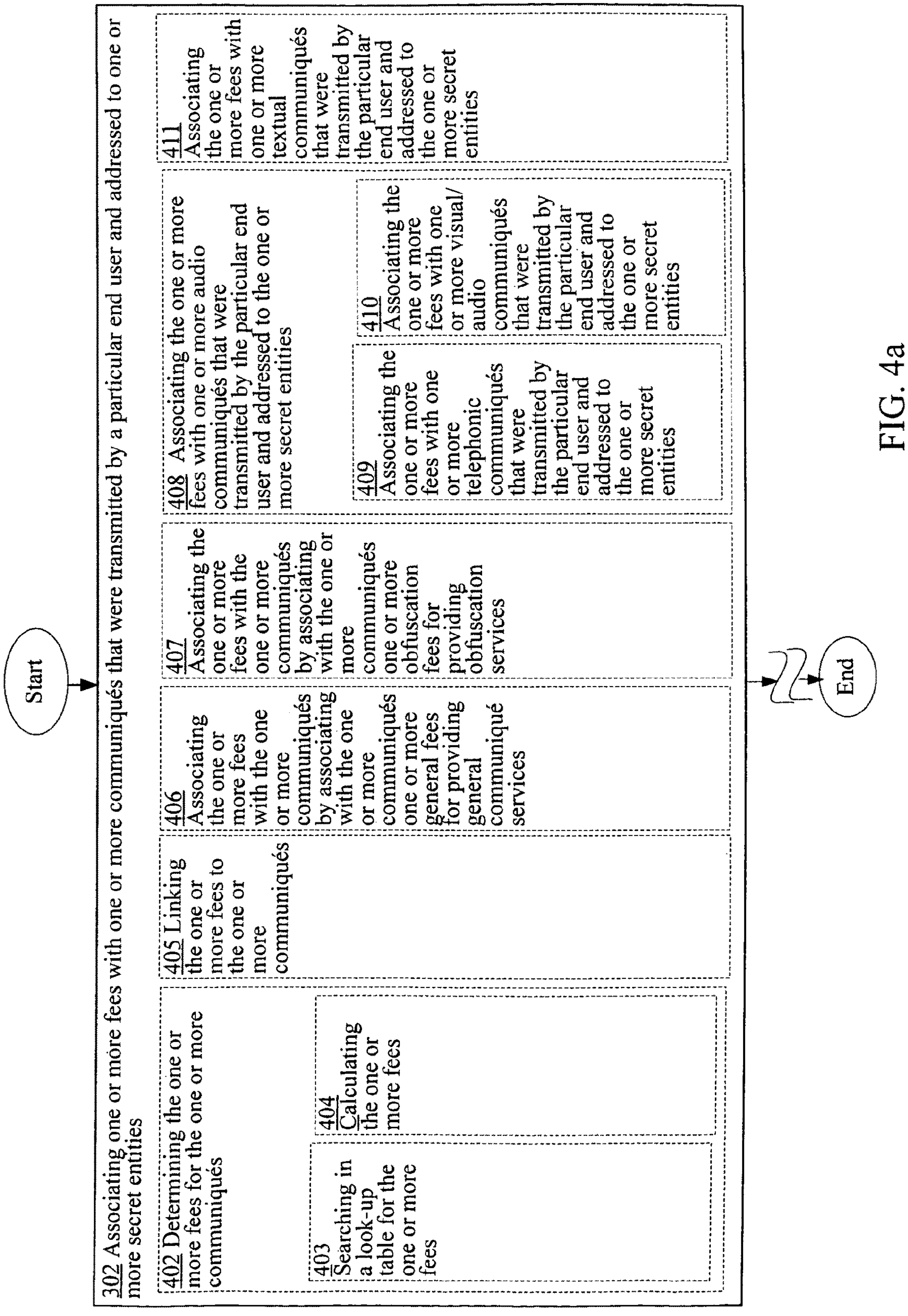
FIG. 4*a* is a high-level logic flowchart of a process depicting alternate implementations of the fee associating operation 302 of FIG. 3.
Figure 4B:
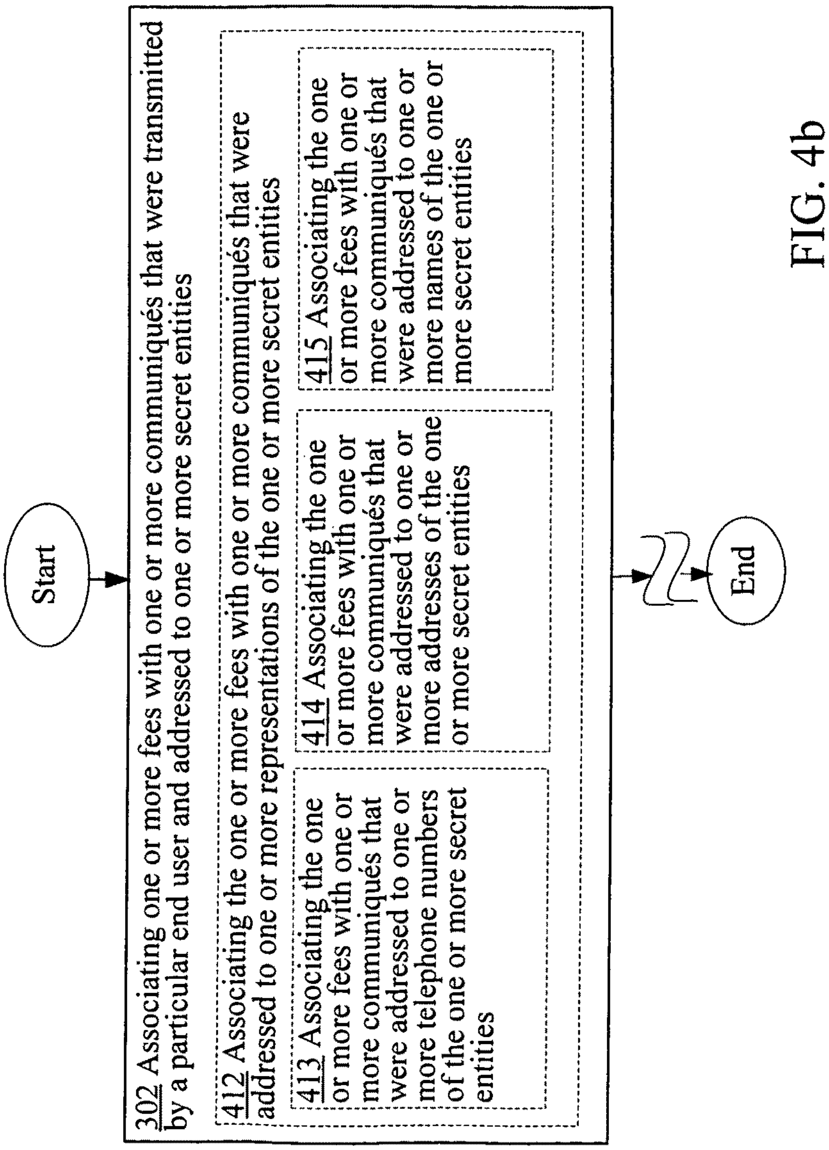
FIG. 4*b* is a high-level logic flowchart of a process depicting alternate implementations of the fee associating operation 302 of FIG. 3.

As will be further described herein, the fee associating operation 302 and the billing statement providing operation 304 of FIG. 3 may be executed in a variety of different ways in various alternative implementations. FIGS. 4*a* and 4*b*, for example, illustrate at least some of the alternative ways that the fee associating operation 302 of FIG. 3 may be executed in various alternative implementations. For example, in various implementations, the fee associating operation 302 of FIG. 3 may include an operation 402 for determining the one or more fees for the one or more communiqués as depicted in FIG. 4*a*. For instance, the fee determining module 202 (see FIG. 2*a*) of the computing system 10 of FIG. 1*b* determining the one or more fees (e.g., calculating and/or finding the one or more fees including calculating and/or finding no fees) for the one or more communiqués 52.

As those of ordinary skill will recognize, there are numerous ways to determine a fee for obfuscating a secret entity 20 with respect to a communiqué 52. For example, in some implementations, operation 402 may further include an operation 403 for searching in a look-up table for the one or more fees as further depicted in FIG. 4*a*. For instance, the fee look-up table searching module 203 (see FIG. 2*a*) of the computing system 10 of FIG. 1*b* searching in a look-up table 57 for the one or more fees.

In the same or alternative implementations, operation 402 may include an operation 404 for calculating the one or more fees as further illustrated in FIG. 4*a*. For instance, the fee calculating module 204 (see FIG. 2*a*) of the computing system 10 of FIG. 2*b* calculating the one or more fees. Note that in order to determine the one or more fees, the one or more fees may be calculated based on one or more formulas, by looking up one or more rates in a rates look-up table and then calculating the one or more fees, or by simply looking up the one or more fees in a look-up table (without any calculations).

As further illustrated in FIG. 4*a*, the fee associating operation 302 of FIG. 3 may additionally or alternatively include an operation 405 for linking the one or more fees to the one or more communiqués. For instance, the fee linking module 205 (see FIG. 2*a*) of the computing system 10 of FIG. 1*b* linking (e.g., attaching or tagging) the one or more fees to the one or more communiqués 52.

Various types of fees may be associated with the one or more communiqués 52 in various alternative implementations. For example, in some cases, the fee associating operation 302 of FIG. 3 may include an operation 406 for associating the one or more fees with the one or more communiqués by associating with the one or more communiqués one or more general fees for providing general communiquéservices as further depicted in FIG. 4*a*. For instance, the fee associating module 102 of the computing system 10 of FIG. 1*b* associating the one or more fees with the one or more communiqués 52 by associating with the one or more communiqués 52 one or more general fees for providing general communiquéservices (e.g., for providing general telephonic services or email services).

In the same or alternative implementations, the fee associating operation 302 of FIG. 3 may alternatively or additionally include an operation 407 for associating the one or more fees with the one or more communiqués by associating with the one or more communiqués one or more obfuscation fees for providing obfuscation services as depicted in FIG. 4*a*. For instance, the fee associating module 102 of the computing system 10 of FIG. 1*b* associating the one or more fees with the one or more communiqués 52 by associating with the one or more communiqués 52 one or more obfuscation fees for providing obfuscation services (e.g., associating a flat monthly fee for providing general obfuscation services or associating incremental fees for each executed obfuscation that were provided).

In various implementations, the one or more communiqués 52 that are referred to in the fee associating operation 302 of FIG. 3 may be a variety of electronic communiqués in various alternative implementations. For example, in some implementations, the fee associating operation 302 of FIG. 3 may include an operation 408 for associating the one or more fees with one or more audio communiqués that were transmitted by the particular end user and addressed to the one or more secret entities as further illustrated in FIG. 4*a*. For instance, the fee associating module 102 of the computing system 10 of FIG. 1*b* associating the one or more fees with one or more audio communiqués (e.g., telephonic calls and/or messages, video messages, and so forth).

As further illustrated in FIG. 4*a*, operation 408 may include one or more additional operations in various alternative implementations. For example, in some implementations operation 408 may include an operation 409 for associating the one or more fees with one or more telephonic communiqués that were transmitted by the particular end user and addressed to the one or more secret entities. For instance, the fee associating module 102 of the computing system 10 of FIG. 1*b* associating the one or more fees with one or more telephonic communiqués (e.g., VoIP calls or messages, landline calls or messages, cellular telephone calls, voice messaging, and so forth) that were transmitted by the particular end user 32 and addressed to the one or more secret entities 20.

In some implementations, operation 408 may alternatively or additionally include an operation 410 for associating the one or more fees with one or more visual/audio communiqués that were transmitted by the particular end user and addressed to the one or more secret entities. For instance, the fee associating module 102 of the computing system 10 of FIG. 1*b* associating the one or more fees with one or more visual/audio communiqués (e.g., video messages or calls that include both visual and audio components) that were transmitted by the particular end user 32 and addressed to the one or more secret entities 20.

In some implementations, the fee associating operation 302 of FIG. 3 may include an operation 411 for associating the one or more fees with one or more textual communiqués that were transmitted by the particular end user and addressed to the one or more secret entities as further depicted in FIG. 4*a*. For instance, the fee associating module 102 of the computing system 10 of FIG. 1*b* associating the one or more fees with one or more textual communiqués (e.g., email messages, IMs, text messages, and so forth) that were transmitted by the particular end user 32 and addressed to the one or more secret entities 20.

In the same or different implementations, the fee associating operation 302 of FIG. 3 may include an operation 412 for associating the one or more fees with one or more communiqués that were addressed to one or more representations of the one or more secret entities as further depicted in FIG. 4*b*. For instance, the fee associating module 102 of the computing system 10 of FIG. 1*b* associating the one or more fees with one or more communiqués 52 that were addressed to (e.g., being sent to or transmitted to) one or more representations 53 (e.g., identifiers) of the one or more secret entities 20 and that were transmitted by the particular end user 32.

As further illustrated in FIG. 4*b*, operation 412 may include one or more additional operations in various alternative implementations. For example, in some implementations, operation 412 may include an operation 413 for associating the one or more fees with one or more communiqués that were addressed to one or more telephone numbers of the one or more secret entities. For instance, the fee associating module 102 of the computing system 10 of FIG. 1*b* associating the one or more fees with one or more communiqués 52 that were addressed to one or more telephone numbers of the one or more secret entities 20.

In the same or different implementations, operation 412 may include an operation 414 for associating the one or more fees with one or more communiqués that were addressed to one or more addresses of the one or more secret entities. For instance, the fee associating module 102 of the computing system 10 of FIG. 1*b* associating the one or more fees with one or more communiqués 52 that were addressed to one or more addresses (e.g., email addresses, IP addresses, URL, etc.) of the one or more secret entities 20.

In the same or different implementations, operation 412 may include an operation 415 for associating the one or more fees with one or more communiqués that were addressed to one or more names of the one or more secret entities. For instance, the fee associating module 102 of the computing system 10 of FIG. 1*b* associating the one or more fees with one or more communiqués 52 that were addressed to one or more names (e.g., usernames, legal names, business names, website names, etc.) of the one or more secret entities 20.

Referring back to the billing statement providing operation 304 of FIG. 3, the billing statement providing operation 304 similar to the fee associating operation 302 of FIG. 3 may be executed in a number of different ways in various alternative implementations as illustrated in FIGS. 5*a*, 5*b*, 5*c*, 5*d*, and 5*e*. For example, and turning now to FIG. 5*a*, in some implementations, the billing statement providing operation 304 of FIG. 3 may include an operation 516 for determining whether one or more hardcopy billing statements that indicate the one or more fees without at least directly identifying the one or more secret entities are to be generated, and if so, prompting generation of the one or more hardcopy billing statements. For instance, the hardcopy billing statement generation determining module 210 including the hardcopy billing statement generation prompting module 220 (see FIG. 2*b*) of the computing system 10 of FIG. 1*b* determining whether one or more hardcopy billing statements 54' that indicate the one or more fees without at least directly identifying the one or more secret entities 20 are to be generated, and if so, the hardcopy billing statement generation prompting module 220 prompting (e.g., directing or instructing a hardcopy billing statement generating system 105, which may or may not be part of the computing system 10) generation of the one or more hardcopy (e.g., paper copy) billing statements 54'. Note that since it may be generally difficult to control who has access to hardcopy billing statements 54', in some implementations, whenever it is determined that one or more hardcopy billing statements 54' are to be generated, the default may be to obfuscate the one or more secret entities 20 with respect to the one or more hardcopy billing statements 54' to be generated. Thus, for these implementations, upon determination that one or more hardcopy billing statements 54' are to be generated, then the one or more secret entities 20 may be obfuscated with respect to the one or more hardcopy billing statements 54'.

In some cases, the billing statement providing operation 304 of FIG. 3 may include providing the one or more billing statements in electronic form. For example, and as further illustrated in FIG. 5*a*, in some implementations the billing statement providing operation 304 may include an operation 517 for providing one or more electronic billing statements that indicate the one or more fees without at least directly identifying the one or more secret entities, the providing of the one or more electronic billing statements being in accordance with the one or more conditional directives of the particular end user. For instance, the electronic billing statement providing module 222 (see FIG. 2*b*) of the computing system 10 of FIG. 1*b* providing (e.g., generating, transmitting, sending, and so forth) one or more electronic billing statements 54 that indicate the one or more fees without at least directly identifying the one or more secret entities 20, the providing of the one or more electronic billing statements 54 being in accordance with the one or more conditional directives 50 of the particular end user 32.

Figure 5A:
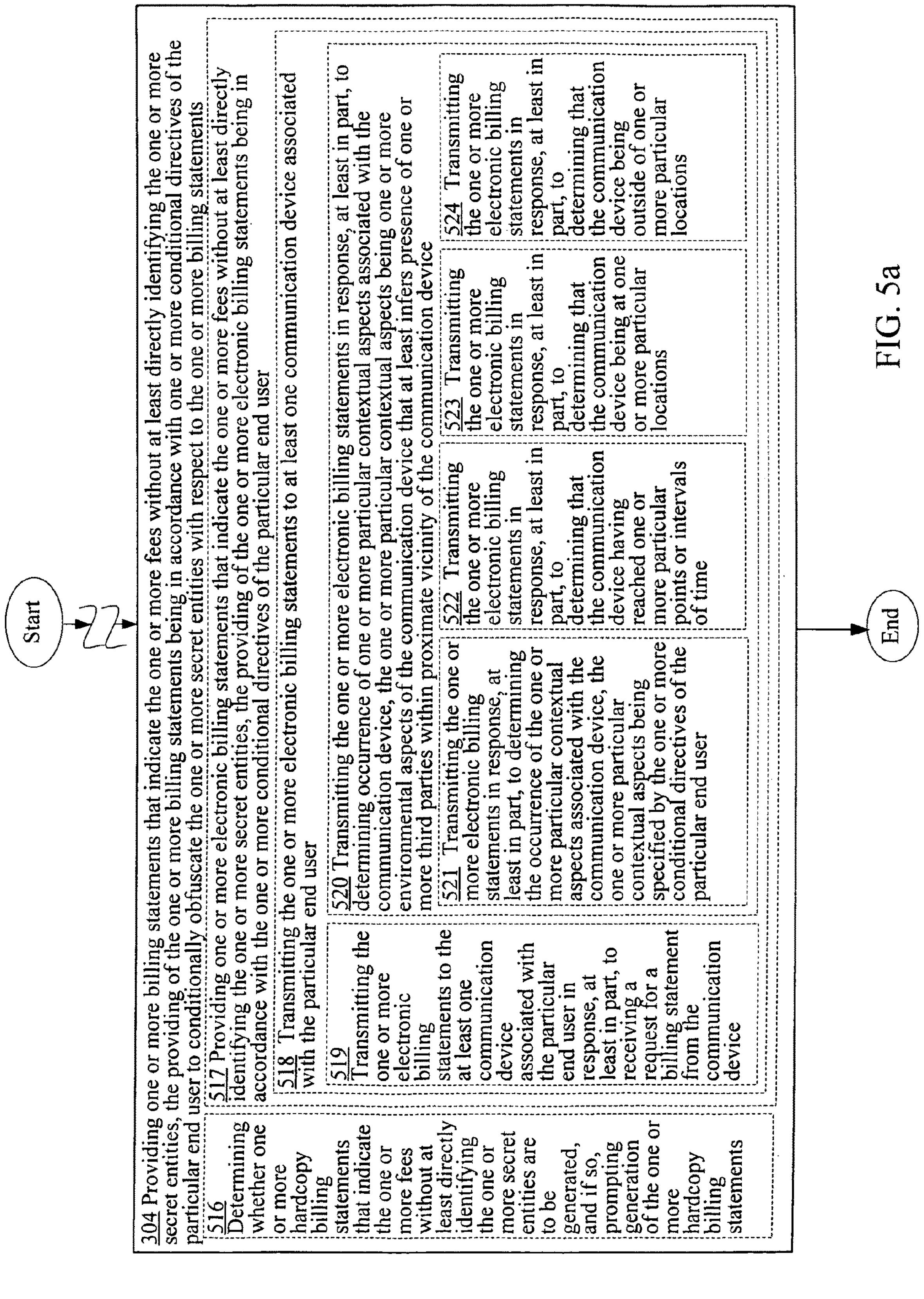
FIG. 5*a* is a high-level logic flowchart of a process depicting alternate implementations of the billing statement providing operation 304 of FIG. 3.
Figure 5B:
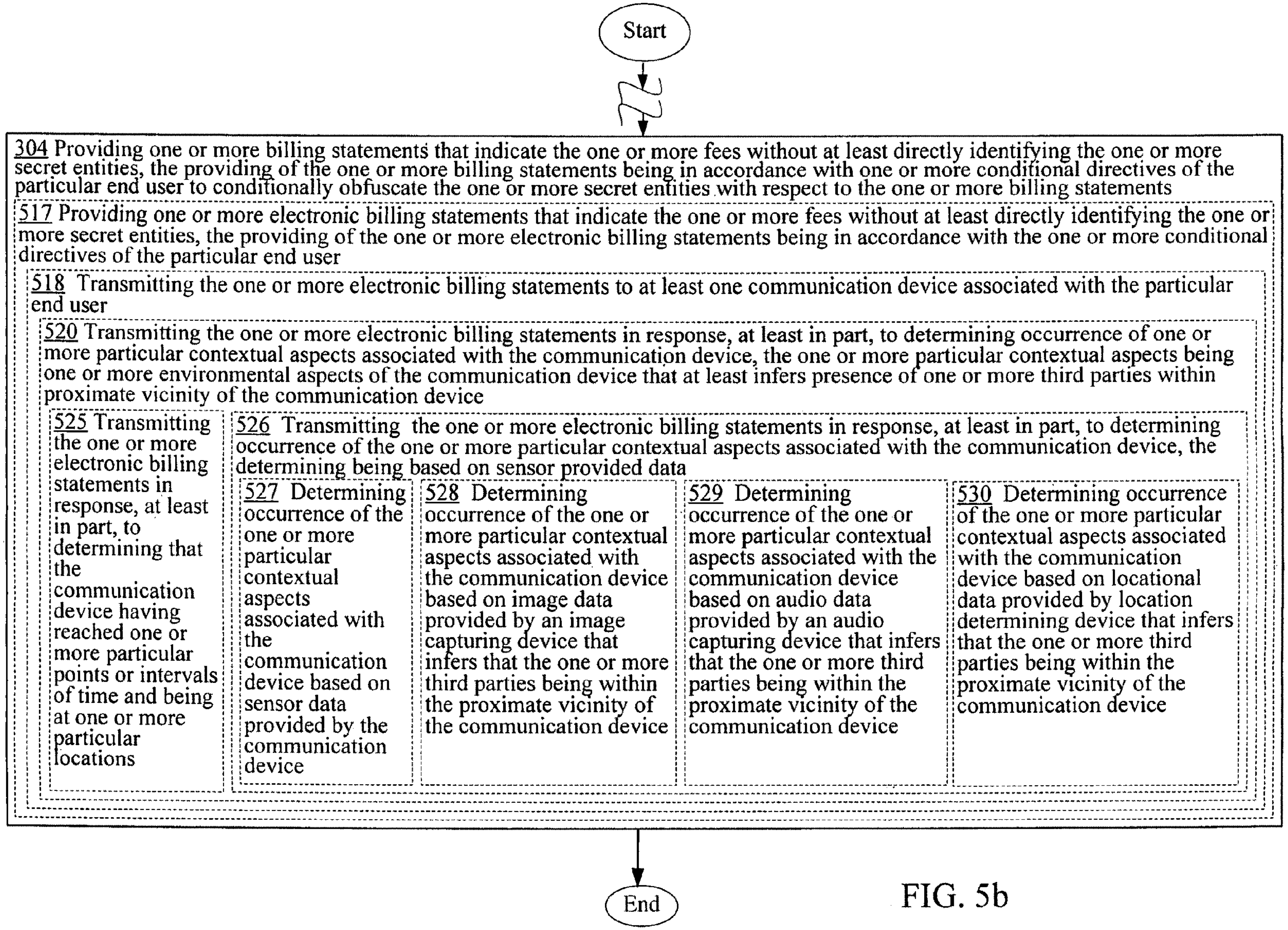
FIG. 5*b* is a high-level logic flowchart of a process depicting alternate implementations of the billing statement providing operation 304 of FIG. 3.
Figure 5C:
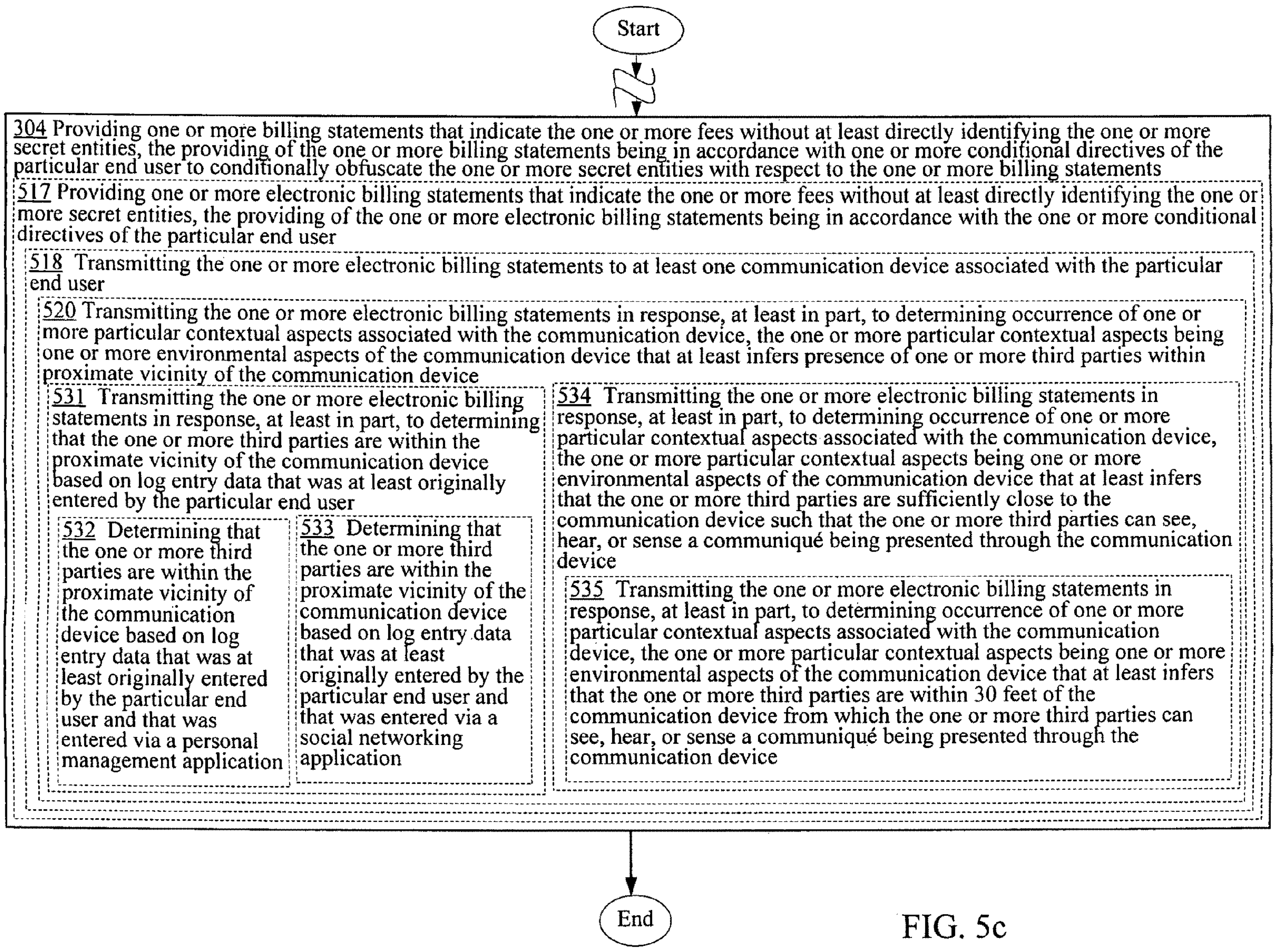
FIG. 5*c* is a high-level logic flowchart of a process depicting alternate implementations of the billing statement providing operation 304 of FIG. 3.

As further illustrated in FIGS. 5*a*, 5*b*, and 5*c*, operation 517 may include one or more additional operations in various alternative implementations. For example, in some implementations, operation 517 may include an operation 518 for transmitting the one or more electronic billing statements to at least one communication device associated with the particular end user as depicted in FIGS. 5*a*, 5*b*, and 5*c*. For instance, the electronic billing statement transmitting module 224 (see FIG. 2*b*) of the computing system 10 of FIG. 1*b* transmitting (e.g., via one or more communication networks 40) the one or more electronic billing statements 54 to at least one communication device 34 (e.g., a Smartphone, a laptop or desktop computer, a PDA, a Netbook, a workstation, and so forth) associated with the particular end user 32.

In some cases, operation 518 may further include an operation 519 for transmitting the one or more electronic billing statements to the at least one communication device associated with the particular end user in response, at least in part, to receiving a request for a billing statement from the communication device as depicted in FIG. 5*a*. For instance, the electronic billing statement transmitting module 224 of the computing system 10 of FIG. 1*b* transmitting the one or more electronic billing statements 54 to the at least one communication device 34 associated with the particular end user 32 in response, at least in part, to receiving a request for a billing statement from the communication device 34.

In the same or different implementations, operation 518 may include an operation 520 for transmitting the one or more electronic billing statements in response, at least in part, to determining occurrence of one or more particular contextual aspects associated with the communication device, the one or more particular contextual aspects being one or more environmental aspects of the communication device that at least infers presence of one or more third parties within proximate vicinity of the communication device as depicted in FIGS. 5*a*, 5*b*, and 5*c*. For instance, the electronic billing statement transmitting module 224 and the contextual aspect occurrence determining module 226 (see FIG. 2*b*) of the computing system 10 of FIG. 1*b* transmitting the one or more electronic billing statements 54 in response, at least in part, to the contextual aspect occurrence determining module 226 determining occurrence of one or more particular contextual aspects associated with the communication device 34, the one or more particular contextual aspects being one or more environmental aspects (e.g., relative time or location, and/or environmental audio or visual indicators) of the communication device 34 that at least infers presence of one or more third parties within proximate vicinity (e.g., within 5 feet, 10 feet, 20 feet, or within any other distance from the communication device 34 from which a third party is able to hear/see/sense a communiqué 52 being presented through the communication device 34) of the communication device 34.

As further illustrated in FIGS. 5*a*, 5*b*, and 5*c*, operation 520 may include one or more additional operations in various alternative implementations. For example, in some implementations, operation 520 may include an operation 521 for transmitting the one or more electronic billing statements in response, at least in part, to determining the occurrence of the one or more particular contextual aspects associated with the communication device, the one or more particular contextual aspects being specified by the one or more conditional directives of the particular end user as depicted in FIG. 5*a*. For instance, the electronic billing statement transmitting module 224 and the contextual aspect occurrence determining module 226 of the computing system 10 of FIG. 1*b* transmitting the one or more electronic billing statements 54 in response, at least in part, to the contextual aspect occurrence determining module 226 determining the occurrence of the one or more particular contextual aspects associated with the communication device 34 (e.g., determining based on contextual aspect data 55 provided by the communication device 34), the one or more particular contextual aspects being specified by the one or more conditional directives 50 of the particular end user 32. For example, in some cases, the particular end user 32 may specify that the identities of the secret entities 20 may be obfuscated with respect to the electronic billing statements 54 when the communication device 34 has reached one or more specified points in time, is at one or more specified locations, is determined to be in the presence of one or more third parties based on one or more audio and/or visual indicators, and so forth.

In the same or different implementations, operation 520 may include an operation 522 for transmitting the one or more electronic billing statements in response, at least in part, to determining that the communication device having reached one or more particular points or intervals of time. For instance, the electronic billing statement transmitting module 224 and the communication device time determining module 228 (see FIG. 2*b*) of the computing system 10 of FIG. 1*b* transmitting the one or more electronic billing statements 54 in response, at least in part, to the communication device time determining module 228 determining that the communication device 34 having reached one or more particular points or intervals of time (e.g., one or more specified points or intervals of time as specified by the conditional directives 50 of the particular end user 32). In some cases, the communication device time determining module 228 may make the time determination based on contextual aspect data 55 (which may indicate the relative time with respect to the communication device 34) provided by the communication device 34.

In the same or different implementations, operation 520 may include an operation 523 for transmitting the one or more electronic billing statements in response, at least in part, to determining that the communication device being at one or more particular locations. For instance, the electronic billing statement transmitting module 224 and the communication device location determining module 230 (see FIG. 2*b*) of the computing system 10 of FIG. 1*b* transmitting the one or more electronic billing statements 54 in response, at least in part, to the communication device location determining module 230 determining that the communication device 34 being at one or more particular locations. In some cases, the communication device location determining module 230 may make the location determination of the communication device 34 based on contextual aspect data 55 (which may include GPS data) provided by the communication device 34.

In the same or different implementations, operation 520 may include an operation 524 for transmitting the one or more electronic billing statements in response, at least in part, to determining that the communication device being outside of one or more particular locations. For instance, the electronic billing statement transmitting module 224 and the communication device location determining module 230 (see FIG. 2*b*) of the computing system 10 of FIG. 1*b* transmitting the one or more electronic billing statements 54 in response, at least in part, to the communication device location determining module 230 determining that the communication device 34 being outside of one or more particular locations (e.g., as specified by the one or more conditional directives 50 of the particular end user 32). Note that in this case, the one or more conditional directives 50 may specify one or more particular locations where it may be "safe" to present one or more electronic billing statements 65 that identify the one or more secret entities 20 without fear of such electronic billing statements 65 being viewed by one or more third parties.

Turning now to FIG. 5*b*, in the same or different implementations, operation 520 may include an operation 525 for transmitting the one or more electronic billing statements in response, at least in part, to determining that the communication device having reached one or more particular points or intervals of time and being at one or more particular locations. For instance, the electronic billing statement transmitting module 224 including the communication device time determining module 228 and the communication device location determining module 230 of the computing system 10 of FIG. 1*b* transmitting the one or more electronic billing statements 54 in response, at least in part, to the communication device time determining module 228 and the communication device location determining module 230 respectively determining that the communication device 34 having reached one or more particular points or intervals of time and being at one or more particular locations.

In some implementations, operation 520 may include an operation 526 for transmitting the one or more electronic billing statements in response, at least in part, to determining occurrence of the one or more particular contextual aspects associated with the communication device, the determining being based on sensor provided data as further illustrated in FIG. 5*b*. For instance, the electronic billing statement transmitting module 224 and the contextual aspect occurrence determining module 226 of the computing system 10 of FIG. 1*b* transmitting the one or more electronic billing statements 54 in response, at least in part, to the contextual aspect occurrence determining module 226 determining occurrence of the one or more particular contextual aspects associated, with the communication device 34, the determining being based on sensor provided data as provided by one or more sensors 36. The one or more sensors 36 referenced here may be in reference to a wide variety of devices including, for example, an image capturing device such as a webcam or digital camera, an audio capturing device such as a microphone, a location tracking device such as a GPS, and so forth.

As further illustrated in FIG. 5*b*, operation 526 may further include one or more additional operations in various alternative implementations. For example, in some implementations, operation 526 may include an operation 527 for determining occurrence of the one or more particular contextual aspects associated with the communication device based on sensor data provided by the communication device. For instance, the contextual aspect occurrence determining module 226 of the computing system 10 of FIG. 1*b* determining occurrence of the one or more particular contextual aspects associated with the communication device 34 based on sensor data provided by the communication device 34. That is, sensor provided data may be provided directly by one or more sensors 36 or may be provided via the communication device 34 when the one or more sensors 36 are, for example integrated into the communication device 34.

In the same or different implementations, operation 526 may, in turn, include an operation 528 for determining occurrence of the one or more particular contextual aspects associated with the communication device based on image data provided by an image capturing device that infers that the one or more third parties being within the proximate vicinity of the communication device. For instance, the contextual aspect occurrence determining module 226 of the computing system 10 of FIG. 1*b* determining occurrence of the one or more particular contextual aspects associated with the communication device 34 based on image data provided by an image capturing device (e.g., a webcam, a digital camera, etc.) that infers that the one or more third parties (e.g., the one or more third parties may be one or more specific third parties as specified by the conditional directives 50 or may be any random one or more third parties) being within the proximate vicinity of the communication device 34.

In the same or different implementations, operation 526 may alternatively or additionally include an operation 529 for determining occurrence of the one or more particular contextual aspects associated with the communication device based on audio data provided by an audio capturing device that infers that the one or more third parties being within the proximate vicinity of the communication device. For instance, the contextual aspect occurrence determining module 226 of the computing system 10 of FIG. 1*b* determining occurrence of the one or more particular contextual aspects associated with the communication device 34 based on audio data provided by an audio capturing device (e.g., microphone) that infers (e.g., audio data indicating third party voices) that the one or more third parties being within the proximate vicinity of the communication device 34.

In the same or different implementations, operation 526 may alternatively or additionally include an operation 530 for determining occurrence of the one or more particular contextual aspects associated with the communication device based on locational data provided by location determining device that infers that the one or more third parties being within the proximate vicinity of the communication device. For instance, the contextual aspect occurrence determining module 226 of the computing system 10 of FIG. 1*b* determining occurrence of the one or more particular contextual aspects associated with the communication device 34 based on locational data provided by location determining device (e.g., GPS) that infers (e.g., locational data indicates communication device 34 is at workplace) that the one or more third parties being within the proximate vicinity of the communication device 34.

Turning now to FIG. 5*c*, in various implementations, operation 520 for transmitting the one or more electronic billing statements in response, at least in part, to determining occurrence of one or more particular contextual aspects associated with the communication device, the one or more particular contextual aspects being one or more environmental aspects of the communication device that at least infers presence of one or more third parties within proximate vicinity of the communication device may include an operation 531 for transmitting the one or more electronic billing statements in response, at least in part, to determining that the one or more third parties are within the proximate vicinity of the communication device based on log entry data that was at least originally entered by the particular end user. For instance, the electronic billing statement transmitting module 224 and the third party proximity determining module 232 (see FIG. 2*b*) of the computing system 10 of FIG. 1*b* transmitting the one or more electronic billing statements 54 in response, at least in part, to the third party proximity determining module 232 determining that the one or more third parties are within the proximate vicinity of the communication device 34 based on log entry data (e.g., data that indicates various daily and/or periodic aspects of the particular end user 32 as reported by the particular end user 32) that was at least originally entered by the particular end user 32. Note that the log entry data may have been provided to the computing system 10 as part of the contextual aspect data 55 provided by the end user entity 30.

The log entry data referred to in operation 531 may have been entered in a variety of different ways in various alternative implementations. For example, in some implementations, operation 531 may include an operation 532 for determining that the one or more third parties are within the proximate vicinity of the communication device based on log entry data that was at least originally entered by the particular end user and that was entered via a personal management application as further depicted in FIG. 5*c*. For instance, the third party proximity determining module 232 of the computing system 10 determining that the one or more third parties are within the proximate vicinity of the communication device 34 based on log entry data that was at least originally entered by the particular end user 32 and that was entered via a personal management application (e.g., Microsoft Outlook).

In some implementations, operation 531 may include an operation 533 for determining that the one or more third parties are within the proximate vicinity of the communication device based on log entry data that was at least originally entered by the particular end user and that was entered via a social networking application as further depicted in FIG. 5*c*. For instance, the third party proximity determining module 232 of the computing system 10 determining that the one or more third parties are within the proximate vicinity of the communication device 34 based on log entry data that was at least originally entered by the particular end user 32 and that was entered via a social networking application (e.g., a microblogging application such as an application for Twitter or a social networking website application such as an application for Facebook).

In various implementations, operation 520 for transmitting the one or more electronic billing statements in response, at least in part, to determining occurrence of one or more particular contextual aspects associated with the communication device, the one or more particular contextual aspects being one or more environmental aspects of the communication device that at least infers presence of one or more third parties within proximate vicinity of the communication device may include an operation 534 for transmitting the one or more electronic billing statements in response, at least in part, to determining occurrence of one or more particular contextual aspects associated with the communication device, the one or more particular contextual aspects being one or more environmental aspects of the communication device that at least infers that the one or more third parties are sufficiently close to the communication device such that the one or more third parties can see, hear, or sense a communiqué being presented through the communication device as further illustrated in FIG. 5*c*. For instance, the electronic billing statement transmitting module 224 and the contextual aspect occurrence determining module 226 of the computing system 10 of FIG. 1*b* transmitting the one or more electronic billing statements 54 in response, at least in part, to the contextual aspect occurrence determining module 226 determining occurrence of one or more particular contextual aspects associated with the communication device 34, the one or more particular contextual aspects being one or more environmental aspects of the communication device 34 that at least infers that the one or more third parties are sufficiently close to the communication device 34 such that the one or more third parties can see, hear, or sense a communiqué 52 being presented through the communication device 34.

As further illustrated in FIG. 5*c*, in some implementations, operation 534 may further include an operation 535 for transmitting the one or more electronic billing statements in response, at least in part, to determining occurrence of one or more particular contextual aspects associated with the communication device, the one or more particular contextual aspects being one or more environmental aspects of the communication device that at least infers that the one or more third parties are within 30 feet of the communication device from which the one or more third parties can see, hear, or sense a communiqué being presented through the communication device. For instance, the electronic billing statement transmitting module 224 and the contextual aspect occurrence determining module 226 of the computing system 10 of FIG. 1*b* transmitting the one or more electronic billing statements 54 in response, at least in part, to the contextual aspect occurrence determining module 226 determining occurrence of one or more particular contextual aspects associated with the communication device 34, the one or more particular contextual aspects being one or more environmental aspects of the communication device 34 that at least infers that the one or more third parties are within 30 feet of the communication device 34 from which the one or more third parties can see, hear, or sense a communiqué 52 being presented through the communication device 34. Note that the 30 feet distance referred to above is merely a randomly chosen distance. Thus, in other embodiments and depending on circumstances, this distance may be other maximum distances (e.g., 20 feet, 15 feet, 5 feet, 50 feet, and so forth) from the communication device 34 from which a third party is able to see, hear, and/or sense a communiqué 52 being presented through the communication device 34.

Figure 5D:
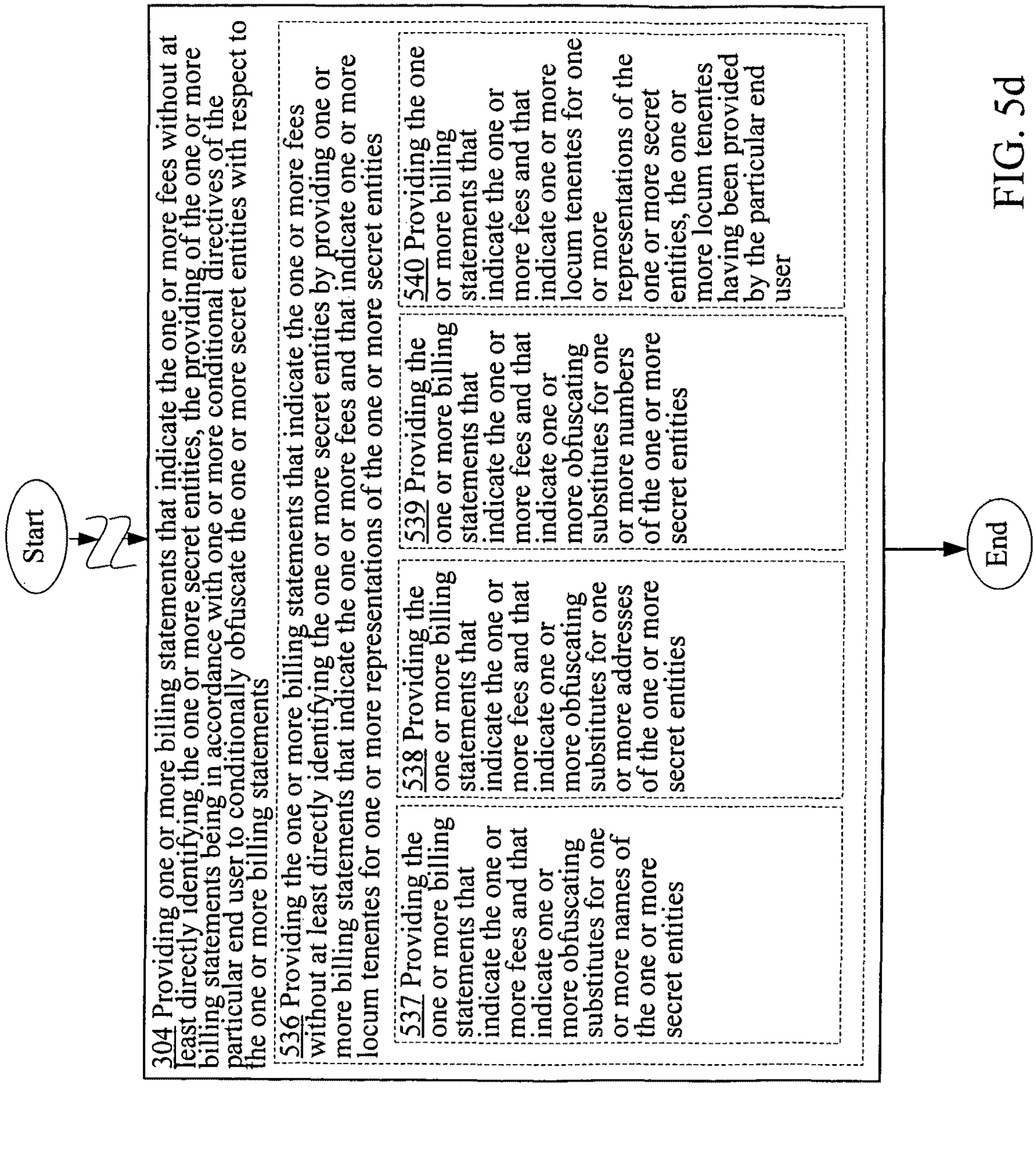
FIG. 5*d* is a high-level logic flowchart of a process depicting alternate implementations of the billing statement providing operation 304 of FIG. 3.
Figure 5E:
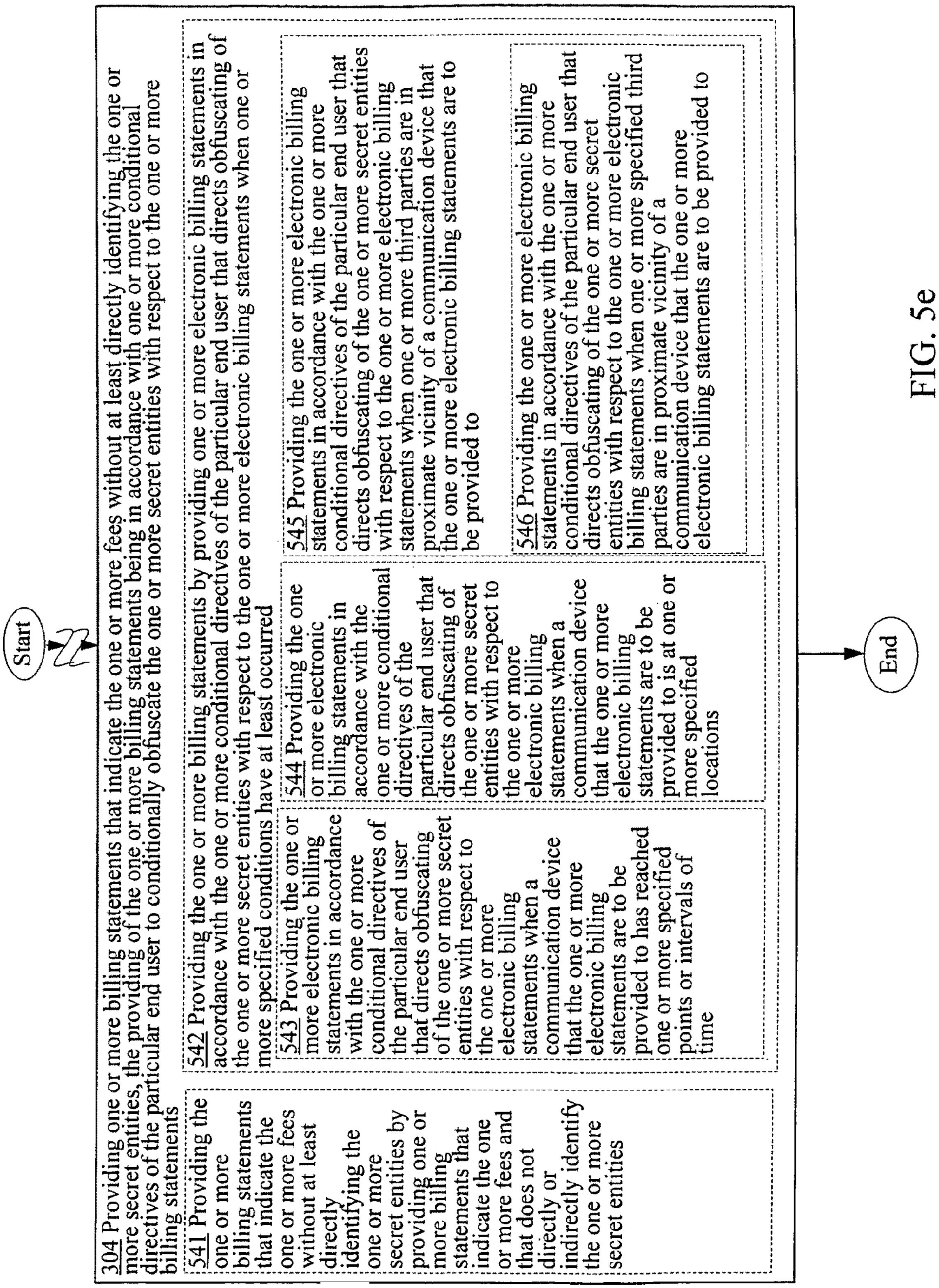
FIG. 5*e* is a high-level logic flowchart of a process depicting alternate implementations of the billing statement providing operation 304 of FIG. 3.

Turning now to FIGS. 5*d* and 5*e*, in various implementations, the one or more billing statements 54* provided by the billing statement providing operation 304 of FIG. 3 may conceal or obfuscate the secret entities 20 in various ways in various alternative implementations. In some cases, for example, the one or more billing statements 54* that may be provided through the billing statement providing operation 304 may be completely devoid of any (direct or indirect) indications of the secret entities 20. In other cases, however, the billing statement providing operation 304 may include an operation 536 for providing the one or more billing statements that indicate the one or more fees without at least directly identifying the one or more secret entities by providing one or more billing statements that indicate the one or more fees and that indicate one or more locum tenentes for one or more representations of the one or more secret entities as illustrated in FIG. 5*d*. For instance, the billing statement providing module 104 of the computing system 10 of FIG. 1*b* providing the one or more billing statements 54* that indicate the one or more fees without at least directly identifying the one or more secret entities 20 by providing one or more billing statements 54* that indicate the one or more fees and that indicate one or more locum tenentes 53' (e.g., obfuscating substitutes or placeholders) for one or more representations (e.g., telephone numbers, email addresses, names, and so forth) of the one or more secret entities 20.

As further illustrated in FIGS. 5*d*, operation 536 may further include one or more additional operations in various alternative implementations. For example, in some implementations, operation 536 may include an operation 537 for providing the one or more billing statements that indicate the one or more fees and that indicate one or more obfuscating substitutes for one or more names of the one or more secret entities as illustrated in FIG. 5*d*. For instance, the billing statement providing module 104 of the computing system 10 of FIG. 1*b* providing the one or more billing statements 54* that indicate the one or more fees and that indicate one or more obfuscating substitutes (e.g., factious names or names belonging to unrelated third parties who may be known by the particular end user 32) for one or more names (e.g., usernames) of the one or more secret entities 20.

In the same or different implementations, operation 536 may additionally or alternatively include an operation 538 for providing the one or more billing statements that indicate the one or more fees and that indicate one or more obfuscating substitutes for one or more addresses of the one or more secret entities. For instance, the billing statement providing module 104 of the computing system 10 of FIG. 1*b* providing the one or more billing statements 54 that indicate the one or more fees and that indicate one or more obfuscating substitutes (e.g., fictitious email addresses or email addresses belonging to unrelated third parties who may be known by the particular end user 32) for one or more addresses (e.g., email addresses) of the one or more secret entities 20.

In the same or different implementations, operation 536 may include an operation 539 for providing the one or more billing statements that indicate the one or more fees and that indicate one or more obfuscating substitutes for one or more numbers of the one or more secret entities. For instance, the billing statement providing module 104 of the computing system 10 of FIG. 1*b* providing the one or more billing statements 54* that indicate the one or more fees and that indicate one or more obfuscating substitutes (e.g., fictitious telephone numbers or telephone number belonging to unrelated third parties who may be known by the particular end user 32) for one or more numbers (e.g., telephone numbers) of the one or more secret entities 20.

In the same or different implementations, operation 536 may include an operation 540 for providing the one or more billing statements that indicate the one or more fees and that indicate one or more locum tenentes for one or more representations of the one or more secret entities, the one or more locum tenentes having been provided by the particular end user. For instance, the billing statement providing module 104 of the computing system 10 of FIG. 1*b* providing the one or more billing statements 54* that indicate the one or more fees and that indicate one or more locum tenentes 53'(e.g., illusory telephone numbers) for one or more representations 53 (e.g., actual telephone numbers) of the one or more secret entities 20, the one or more locum tenentes 53' having been provided by the particular end user 32 via, for example, the one or more conditional directives 50.

Turning now to FIG. 5*e*, in various implementations, the billing statement providing operation 304 of FIG. 3 may include an operation 541 for providing the one or more billing statements that indicate the one or more fees without at least directly identifying the one or more secret entities by providing one or more billing statements that indicate the one or more fees and that does not directly or indirectly identify the one or more secret entities. For instance, the billing statement providing module 104 of the computing system 10 of FIG. 1*b* providing the one or more billing statements 54* that indicate the one or more fees without at least directly identifying the one or more secret entities 20 by providing one or more billing statements 54* that indicate the one or more fees and that does not directly or indirectly identify the one or more secret entities 20. In other words, providing one or more billing statements 54* that are completely devoid of any direct or indirect references to the one or more secret entities 20.

In the same or different implementations, the billing statement providing operation 304 of FIG. 3 may include an operation 542 for providing the one or more billing statements by providing one or more electronic billing statements in accordance with the one or more conditional directives of the particular end user that directs obfuscating of the one or more secret entities with respect to the one or more electronic billing statements when one or more specified conditions have at least occurred. For instance, the billing statement providing module 104 including the electronic billing statement providing module 222 of the computing system 10 of FIG. 1*b* providing the one or more billing statements by having the electronic billing statement providing module 222 provide one or more electronic billing statements 54 in accordance with the one or more conditional directives 50 of the particular end user 32 that directs obfuscating of the one or more secret entities 20 with respect to the one or more electronic billing statements 54 when one or more specified conditions (e.g., one or more specified environmental conditions of the communication device 34 associated with the particular end user 32) have at least occurred.

As further illustrated in FIG. 5*e*, operation 542 may include one or more additional operations in various alternative implementations. For example, in some implementations, operation 542 may include an operation 543 for providing the one or more electronic billing statements in accordance with the one or more conditional directives of the particular end user that directs obfuscating of the one or more secret entities with respect to the one or more electronic billing statements when a communication device that the one or more electronic billing statements are to be provided to has reached one or more specified points or intervals of time. For instance, the electronic billing statement providing module 222 of the computing system 10 of FIG. 1*b* providing the one or more electronic billing statements 54 in accordance with the one or more conditional directives 50 of the particular end user 32 that directs obfuscating of the one or more secret entities 20 with respect to the one or more electronic billing statements 54 when a communication device 34 that the one or more electronic billing statements 54 are to be provided to has reached one or more specified points or intervals of time.

In the same or different implementations, operation 542 may include an operation 544 for providing the one or more electronic billing statements in accordance with the one or more conditional directives of the particular end user that directs obfuscating of the one or more secret entities with respect to the one or more electronic billing statements when a communication device that the one or more electronic billing statements are to be provided to is at one or more specified locations. For instance, the electronic billing statement providing module 222 of the computing system 10 of FIG. 1*b* providing the one or more electronic billing statements 54 in accordance with the one or more conditional directives 50 of the particular end user 32 that directs obfuscating of the one or more secret entities 20 with respect to the one or more electronic billing statements 54 when a communication device 34 that the one or more electronic billing statements 54 are to be provided to is at one or more specified locations.

In the same or different implementations, operation 542 may include an operation 545 for providing the one or more electronic billing statements in accordance with the one or more conditional directives of the particular end user that directs obfuscating of the one or more secret entities with respect to the one or more electronic billing statements when one or more third parties are in proximate vicinity of a communication device that the one or more electronic billing statements are to be provided to. For instance, the electronic billing statement providing module 222 of the computing system 10 of FIG. 1*b* providing the one or more electronic billing statements 54 in accordance with the one or more conditional directives 50 of the particular end user 32 that directs obfuscating of the one or more secret entities 20 with respect to the one or more electronic billing statements 54 when one or more third parties (e.g., either one or more specific third parties as specified by the one or more conditional directives 50 or any one or more random third parties) are in proximate vicinity of a communication device 34 that the one or more electronic billing statements 54 are to be provided to.

In some implementations, operation 545 may further include an operation 546 for providing the one or more electronic billing statements in accordance with the one or more conditional directives of the particular end user that directs obfuscating of the one or more secret entities with respect to the one or more electronic billing statements when one or more specified third parties are in proximate vicinity of a communication device that the one or more electronic billing statements are to be provided to. For instance, the electronic billing statement providing module 222 of the computing system 10 of FIG. 1*b* providing the one or more electronic billing statements 54 in accordance with the one or more conditional directives 50 of the particular end user 32 that directs obfuscating of the one or more secret entities 20 with respect to the one or more electronic billing statements 54 when one or more specified third parties are in proximate vicinity of a communication device 34 that the one or more electronic billing statements 54 are to be provided to.

Referring now to FIG. 6 illustrating another operational flow 600 in accordance with various embodiments. Operational flow 600 includes certain operations that mirror the operations included in operational flow 300 of FIG. 3. These operations include a fee associating operation 602 and a billing statement providing operation 604 that correspond to and mirror the fee associating operation 302 and the billing statement providing operation 304, respectively, of FIG. 3.

In addition, operational flow 600 may include an operation 606 for transmitting to a communication device associated with the particular end user one or more electronic billing statements that indicate the one or more fees and that identifies the one or more secret entities, the providing being in response, at least in part, to determining occurrence of one or more particular contextual aspects of the communication device, the one or more particular contextual aspects being one or more environmental aspects of the communication device that at least infers absence of one or more third parties within proximate vicinity of the communication device depicted in FIG. 6. For instance, the electronic billing statement transmitting module 224 including the contextual aspect occurrence determining module 226 of the computing system 10 of FIG. 1*b* transmitting to a communication device 34 associated with the particular end user 32 one or more electronic billing statements 65 that indicate the one or more fees and that identifies (e.g., directly indicates) the one or more secret entities 20, the providing being in response, at least in part, to determining occurrence of one or more particular contextual aspects of the communication device 34, the one or more particular contextual aspects being one or more environmental aspects of the communication device 34 that at least infers absence of one or more third parties within proximate vicinity of the communication device 34.

Figure 7:
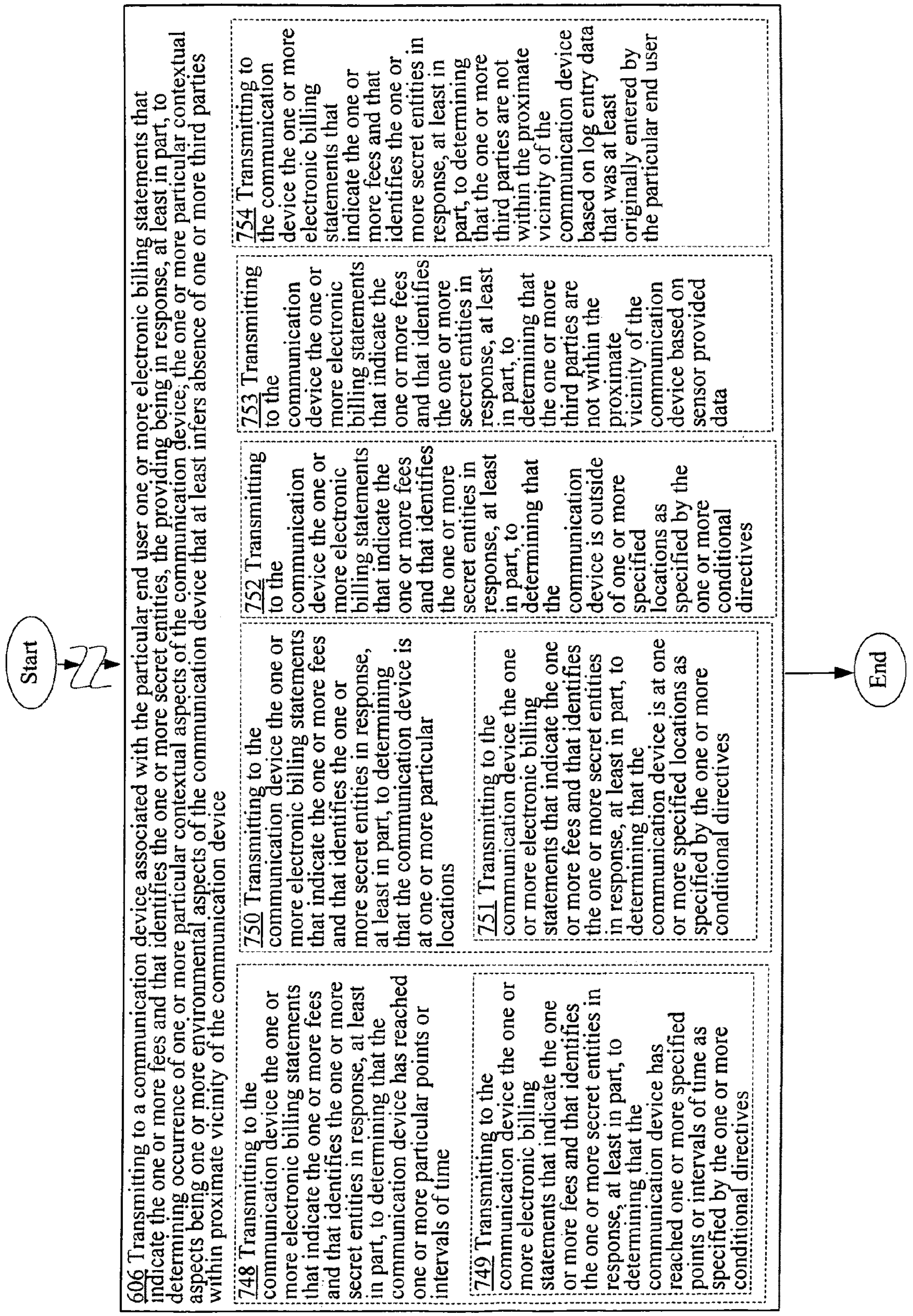
FIG. 7 is a high-level logic flowchart of a process depicting alternate implementations of the transmitting operation 606 of FIG. 6.

Turning now to FIG. 7, in various implementations, the operation 606 for transmitting to a communication device associated with the particular end user one or more electronic billing statements that indicate the one or more fees and that identifies the one or more secret entities, the providing being in response, at least in part, to determining occurrence of one or more particular contextual aspects of the communication device, the one or more particular contextual aspects being one or more environmental aspects of the communication device that at least infers absence of one or more third parties within proximate vicinity of the communication device may include one or more additional operations in various alternative implementations. For example, in some implementations, operation 606 may include an operation 748 for transmitting to the communication device the one or more electronic billing statements that indicate the one or more fees and that identifies the one or more secret entities in response, at least in part, to determining that the communication device has reached one or more particular points or intervals of time. For instance, the electronic billing statement transmitting module 224 including the communication device time determining module 228 of the computing system 10 of FIG. 1*b* transmitting to the communication device 34 the one or more electronic billing statements 65 that indicate the one or more fees and that identifies the one or more secret entities 20 in response, at least in part, to the communication device time determining module 228 determining that the communication device 34 has reached one or more particular points or intervals of time. Such a determination may be made based on, for example, contextual aspect data 55 provided by the communication device 34, which may indicate the relative time of the communication device 34.

In some implementations, operation 748 may further include an operation 749 for transmitting to the communication device the one or more electronic billing statements that indicate the one or more fees and that identifies the one or more secret entities in response, at least in part, to determining that the communication device has reached one or more specified points or intervals of time as specified by the one or more conditional directives. For instance, the electronic billing statement transmitting module 224 including the communication device time determining module 228 of the computing system 10 of FIG. 1*b* transmitting to the communication device 34 the one or more electronic billing statements 65 that indicate the one or more fees and that identifies the one or more secret entities 20 in response, at least in part, to the communication device time determining module 228 determining that the communication device 34 has reached one or more specified points or intervals of time as specified by the one or more conditional directives 50. Note that in various implementations the one or more conditional directives 50 may specify what points or intervals of time should the secret entities 20 be obfuscated and/or what points or intervals of time should the secret entities 20 not be obfuscated.

In some implementations, operation 606 may include an operation 750 for transmitting to the communication device the one or more electronic billing statements that indicate the one or more fees and that identifies the one or more secret entities in response, at least in part, to determining that the communication device is at one or more particular locations. For instance, the electronic billing statement transmitting module 224 including the communication device location determining module 230 of the computing system 10 of FIG. 1*b* transmitting to the communication device 34 the one or more electronic billing statements 65 that indicate the one or more fees and that identifies the one or more secret entities 20 in response, at least in part, to the communication device location determining module 230 determining that the communication device 34 is at one or more particular locations.

In some implementations, operation 750 may further include an operation 751 for transmitting to the communication device the one or more electronic billing statements that indicate the one or more fees and that identifies the one or more secret entities in response, at least in part, to determining that the communication device is at one or more specified locations as specified by the one or more conditional directives. For instance, the electronic billing statement transmitting module 224 including the communication device location determining module 230 of the computing system 10 of FIG. 1*b* transmitting to the communication device 34 the one or more electronic billing statements 65 that indicate the one or more fees and that identifies the one or more secret entities 20 in response, at least in part, to the communication device location determining module 230 determining that the communication device 34 is at one or more specified locations as specified by the one or more conditional directives 50.

In the same or different implementations, operation 606 may include an operation 752 for transmitting to the communication device the one or more electronic billing statements that indicate the one or more fees and that identifies the one or more secret entities in response, at least in part, to determining that the communication device is outside of one or more specified locations as specified by the one or more conditional directives. For instance, the electronic billing statement transmitting module 224 including the communication device location determining module 230 of the computing system 10 of FIG. 1*b* transmitting to the communication device 34 the one or more electronic billing statements 65 that indicate the one or more fees and that identifies the one or more secret entities 20 in response, at least in part, to the communication device location determining module 230 determining that the communication device 34 is outside of one or more specified locations as specified by the one or more conditional directives 50.

In the same or different implementations, operation 606 may include an operation 753 for transmitting to the communication device the one or more electronic billing statements that indicate the one or more fees and that identifies the one or more secret entities in response, at least in part, to determining that the one or more third parties are not within the proximate vicinity of the communication device based on sensor provided data. For instance, the electronic billing statement transmitting module 224 including the third party proximity determining module 232 of the computing system 10 of FIG. 1*b* transmitting to the communication device 34 the one or more electronic billing statements 65 that indicate the one or more fees and that identifies the one or more secret entities 20 in response, at least in part, to the third party proximity determining module 232 determining that the one or more third parties are not within the proximate vicinity of the communication device 34 based on sensor provided data (e.g., data provided by a microphone or an image capturing device such as a webcam or digital camera).

In the same or different implementations, operation 606 may include an operation 754 for transmitting to the communication device the one or more electronic billing statements that indicate the one or more fees and that identifies the one or more secret entities in response, at least in part, to determining that the one or more third parties are not within the proximate vicinity of the communication device based on log entry data that was at least originally entered by the particular end user. For instance, the electronic billing statement transmitting module 224 including the third party proximity determining module 232 of the computing system 10 of FIG. 1*b* transmitting to the communication device 34 the one or more electronic billing statements 65 that indicate the one or more fees and that identifies the one or more secret entities 20 in response, at least in part, to the third party proximity determining module 232 determining that the one or more third parties are not within the proximate vicinity of the communication device 34 based on log entry data that was at least originally entered by the particular end user 32 (e.g., via a personal management application or via a social networking application).

Figure 8:
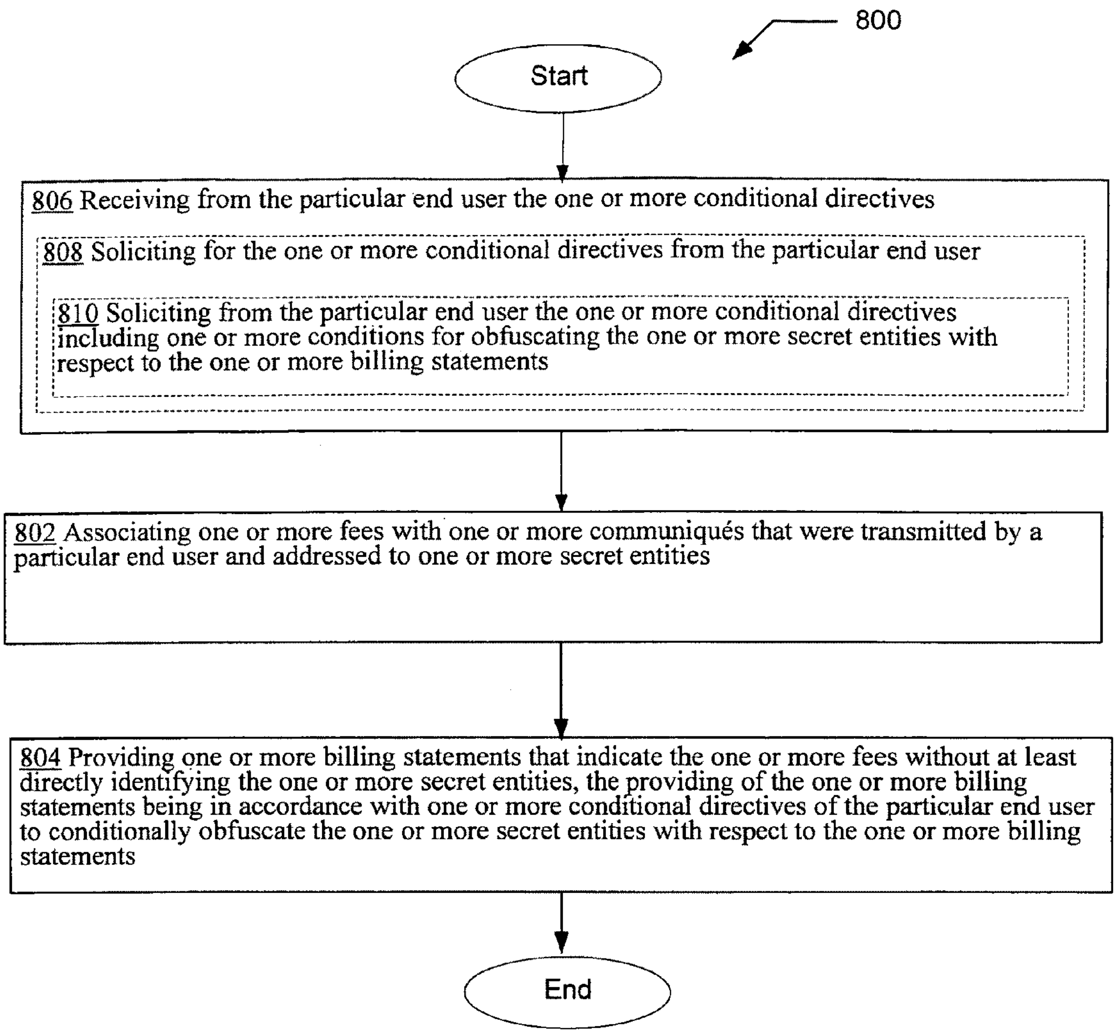
FIG. 8 is another high-level logic flowchart of another process.

Referring now to FIG. 8 illustrating another operational flow 800 in accordance with various embodiments. Operational flow 800 includes certain operations that mirror the operations included in operational flow 300 of FIG. 3. These operations include a fee associating operation 802 and a billing statement providing operation 804 that correspond to and mirror the fee associating operation 302 and the billing statement providing operation 304, respectively, of FIG. 3.

In addition, operational flow 800 may include an operation 806 for receiving from the particular end user the one or more conditional directives. For instance, the conditional directive receiving module 101 of the computing system 10 of FIG. 1*b* receiving from the particular end user 32 the one or more conditional directives 50.

In some implementations, operation 806 may further include an operation 808 for soliciting for the one or more conditional directives from the particular end user. For instance, the conditional directive soliciting module 106 (see FIG. 2*c*) of the computing system 10 of FIG. 1*b* soliciting (e.g., transmitting a request) for the one or more conditional directives 50 from the particular end user 32.

In some cases, operation 808 may, in turn, include an operation 810 for soliciting from the particular end user the one or more conditional directives including one or more conditions for obfuscating the one or more secret entities with respect to the one or more billing statements as illustrated in FIG. 8. For instance, the conditional directive soliciting module 106 including the obfuscation condition soliciting module 107 (see FIG. 2*c*) of the computing system 10 of FIG. 1*b* soliciting from the particular end user 32 the one or more conditional directives 50 including the obfuscation condition soliciting module 107 soliciting for one or more conditions (e.g., one or more environmental conditions such as specific time, location, proximate presence of one or more third parties, and so forth that when detected as occurring prompts obfuscation of the one or more secret entities 20) for obfuscating the one or more secret entities 20 with respect to the one or more billing statements 54*.

Figure 9:
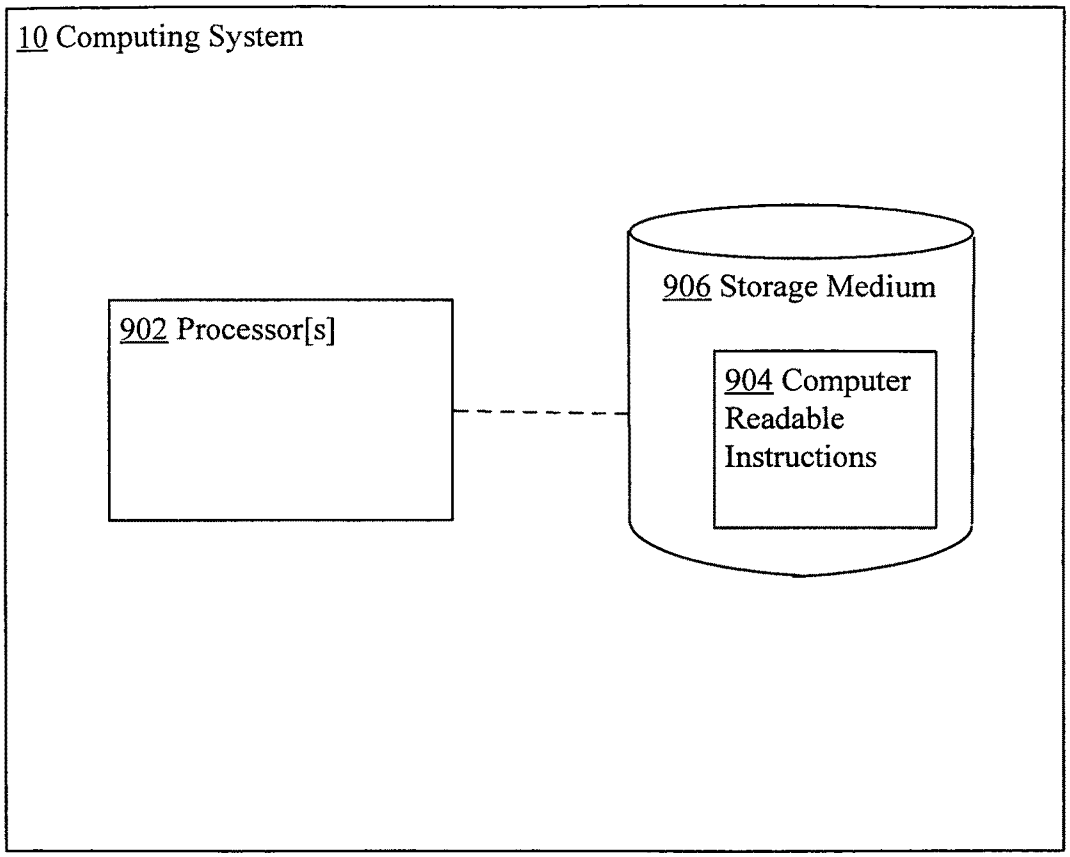
FIG. 9 is another high-level block diagram showing another implementation of the computing system 10 of FIG. 1*b*.

Turning now to FIG. 9, which is a high-level block diagram illustrating a particular implementation of the computing system 10 of FIG. 1*b*. As illustrated, the computing system 10, which may comprise of one or more servers in some embodiments, may include one or more processors 902 (e.g., one or more microprocessors, one or more controllers, and so forth) linked to a storage medium 906 (e.g., volatile and/or non-volatile memory). The storage medium 906 may store computer readable instructions 904 (e.g., computer program product). The one or more processors 902, in various implementations, may execute the computer readable instructions 904 in order to execute one or more operations described above and as illustrated in, for example, FIGS. 3, 4*a*, 4*b*, 5*a*, 5*b*, 5*c*, 5*d*, 5*e*, 6, 7, and 8. From another perspective, FIG. 9 illustrates one implementation of the computing system 10 in which at least the fee associating module 102, the billing statement providing module 104, and their sub-modules (e.g., as illustrated in FIGS. 2*a*, and 2*b*) of the computing system 10 are implemented by the one or more processors 902 executing software (e.g., depicted as computer readable instructions 904 in FIG. 9) that may be stored in a memory 140 (e.g., depicted as storage medium 906 in FIG. 9). Note again that in some embodiments, such as in case of cloud computing, the computing system 10 may be implemented using multiple network component devices (e.g., multiple servers) located at multiple network sites (e.g., the storage medium 906 located at a first network site while the one or more processors 902 located at a second network site).

For example, the processor 902 may execute the computer readable instructions 904 in order to associate one or more fees with one or more communiqués 52 that were transmitted by a particular end user 32 and addressed to one or more secret entities 20; and to provide one or more billing statements 54* that indicate the one or more fees without at least directly identifying the one or more secret entities 20, the providing of the one or more billing statements 54* being in accordance with one or more conditional directives 50 of the particular end user 32 to conditionally obfuscate the one or more secret entities 20 with respect to the one or more billing statements 54* as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:

a fee associating module configured to associate one or more fees with one or more communiqués that were transmitted by a particular end user and addressed to one or more secret entities; and a billing statement providing module configured to provide one or more electronic billing statements that indicate the one or more fees without at least directly identifying the one or more secret entities, the providing of the one or more electronic billing statements being in accordance with one or more conditional directives of the particular end user to conditionally obfuscate the one or more secret entities with respect to the one or more electronic billing statements, the billing statement providing module including at least an electronic billing statement transmitting module configured to transmit the one or more electronic billing statements to at least one communication device associated with the particular end user; and wherein at least one of the fee associating module or the billing statement providing module is at least partially implemented with one or more processing devices.

2. The system of claim 1, wherein said electronic billing statement transmitting module comprises:

an electronic billing statement transmitting module configured to transmit the one or more electronic billing statements to the at least one communication device associated with the particular end user in response, at least in part, to receiving a request for a billing statement from the communication device.

3. The system of claim 1, wherein said electronic billing statement transmitting module comprises:

an electronic billing statement transmitting module including a contextual aspect occurrence determining module configured to transmit the one or more electronic billing statements in response, at least in part, to the contextual aspect occurrence determining module determining occurrence of one or more particular contextual aspects associated with the communication device, the one or more particular contextual aspects being one or more environmental aspects of the communication device that at least implies presence of one or more third parties within proximate vicinity of the communication device.

4. The system of claim 3, wherein said electronic billing statement transmitting module including a contextual aspect occurrence determining module comprises:

an electronic billing statement transmitting module including a contextual aspect occurrence determining module configured to transmit the one or more electronic billing statements in response, at least in part, to the contextual aspect occurrence determining module determining the occurrence of the one or more particular contextual aspects associated with the communication device, the one or more particular contextual aspects being specified by the one or more conditional directives of the particular end user.

5. The system of claim 3, wherein said electronic billing statement transmitting module including a contextual aspect occurrence determining module comprises:

an electronic billing statement transmitting module including a communication device time determining module configured to transmit the one or more electronic billing statements in response, at least in part, to the communication device time determining module determining that the communication device having reached one or more particular points or intervals of time.

6. The system of claim 3, wherein said electronic billing statement transmitting module including a contextual aspect occurrence determining module comprises:

an electronic billing statement transmitting module including a communication device location determining module configured to transmit the one or more electronic billing statements in response, at least in part, to the communication device location determining module determining that the communication device being at one or more particular locations.

7. The system of claim 3, wherein said electronic billing statement transmitting module including a contextual aspect occurrence determining module comprises:

an electronic billing statement transmitting module including a communication device location determining module configured to transmit the one or more electronic billing statements in response, at least in part, to the communication device location determining module determining that the communication device being outside of one or more particular locations.

8. The system of claim 3, wherein said electronic billing statement transmitting module including a contextual aspect occurrence determining module comprises:

an electronic billing statement transmitting module including a communication device time determining module and a communication device location determining module configured to transmit the one or more electronic billing statements in response, at least in part, to the communication device time determining module and the communication device location determining module respectively determining that the communication device having reached one or more particular points or intervals of time and being at one or more particular locations.

9. The system of claim 3, wherein said electronic billing statement transmitting module including a contextual aspect occurrence determining module comprises:

an electronic billing statement transmitting module including a contextual aspect occurrence determining module configured to transmit the one or more electronic billing statements in response, at least in part, to the contextual aspect occurrence determining module determining occurrence of the one or more particular contextual aspects associated with the communication device, the determining being based on sensor provided data.

10. The system of claim 9, wherein said electronic billing statement transmitting module including a contextual aspect occurrence determining module comprises:

a contextual aspect occurrence determining module configured to determine occurrence of the one or more particular contextual aspects associated with the communication device based on sensor data provided by the communication device.

11. The system of claim 9, wherein said electronic billing statement transmitting module including a contextual aspect occurrence determining module comprises:

a contextual aspect occurrence determining module configured to determine occurrence of the one or more particular contextual aspects associated with the communication device based on image data provided by an image capturing device that implies that the one or more third parties being within the proximate vicinity of the communication device.

12. The system of claim 9, wherein said electronic billing statement transmitting module including a contextual aspect occurrence determining module comprises:

a contextual aspect occurrence determining module configured to determine occurrence of the one or more particular contextual aspects associated with the communication device based on audio data provided by an audio capturing device that implies that the one or more third parties being within the proximate vicinity of the communication device.

13. The system of claim 9, wherein said electronic billing statement transmitting module including a contextual aspect occurrence determining module comprises:

a contextual aspect occurrence determining module configured to determine occurrence of the one or more particular contextual aspects associated with the communication device based on locational data provided by location determining device that implies that the one or more third parties being within the proximate vicinity of the communication device.

14. The system of claim 3, wherein said electronic billing statement transmitting module including a contextual aspect occurrence determining module comprises:

an electronic billing statement transmitting module including a third party proximity determining module configured to transmit the one or more electronic billing statements in response, at least in part, to the third party proximity determining module determining that the one or more third parties are within the proximate vicinity of the communication device based on log entry data that was at least originally entered by the particular end user.

15. The system of claim 14, wherein said electronic billing statement transmitting module including a third party proximity determining module comprises:

a third party proximity determining module configured to determine that the one or more third parties are within the proximate vicinity of the communication device based on log entry data that was at least originally entered by the particular end user and that was entered via a personal management application.

16. The system of claim 14, wherein said electronic billing statement transmitting module including a third party proximity determining module comprises:

a third party proximity determining module configured to determine that the one or more third parties are within the proximate vicinity of the communication device based on log entry data that was at least originally entered by the particular end user and that was entered via a social networking application.

17. The system of claim 3, wherein said electronic billing statement transmitting module including a contextual aspect occurrence determining module comprises:

an electronic billing statement transmitting module including a contextual aspect occurrence determining module configured to transmit the one or more electronic billing statements in response, at least in part, to the contextual aspect occurrence determining module determining occurrence of one or more particular contextual aspects associated with the communication device, the one or more particular contextual aspects being one or more environmental aspects of the communication device that at least implies that the one or more third parties are sufficiently close to the communication device such that the one or more third parties can see, hear, or sense a communiqué being presented through the communication device.

18. The system of claim 17, wherein said electronic billing statement transmitting module including a contextual aspect occurrence determining module comprises:

an electronic billing statement transmitting module including a contextual aspect occurrence determining module configured to transmit the one or more electronic billing statements in response, at least in part, to the contextual aspect occurrence determining module determining occurrence of one or more particular contextual aspects associated with the communication device, the one or more particular contextual aspects being one or more environmental aspects of the communication device that at least implies that the one or more third parties are within 30 feet of the communication device from which the one or more third parties can see, hear, or sense a communiqué being presented through the communication device.

19. The system of claim 1, wherein said billing statement providing module comprises:

a billing statement providing module configured to provide the one or more electronic billing statements that indicate the one or more fees without at least directly identifying the one or more secret entities by providing one or more electronic billing statements that indicate the one or more fees and that indicate one or more locum tenentes for one or more representations of the one or more secret entities.

20. The system of claim 19, wherein said billing statement providing module comprises:

a billing statement providing module configured to provide the one or more electronic billing statements that indicate the one or more fees and that indicate one or more obfuscating substitutes for one or more names of the one or more secret entities.

21. The system of claim 19, wherein said billing statement providing module comprises:

a billing statement providing module configured to provide the one or more electronic billing statements that indicate the one or more fees and that indicate one or more obfuscating substitutes for one or more addresses of the one or more secret entities.

22. The system of claim 19, wherein said billing statement providing module comprises:

a billing statement providing module configured to provide the one or more electronic billing statements that indicate the one or more fees and that indicate one or more obfuscating substitutes for one or more numbers of the one or more secret entities.

23. The system of claim 19, wherein said billing statement providing module comprises:

a billing statement providing module configured to provide the one or more electronic billing statements that indicate the one or more fees and that indicate one or more locum tenentes for one or more representations of the one or more secret entities, the one or more locum tenentes having been provided by the particular end user.

24. The system of claim 1, wherein said billing statement providing module comprises:

a billing statement providing module configured to provide the one or more electronic billing statements that indicate the one or more fees without at least directly identifying the one or more secret entities by providing one or more electronic billing statements that indicate the one or more fees and that does not directly or indirectly identify the one or more secret entities.

25. The system of claim 1, wherein said billing statement providing module comprises:

a billing statement providing module configured to provide the one or more electronic billing statements by providing one or more electronic billing statements in accordance with one or more conditional directives of the particular end user that directs obfuscating of the one or more secret entities with respect to the one or more electronic billing statements when one or more specified conditions have at least occurred.

26. The system of claim 25, wherein said billing statement providing module comprises:

a billing statement providing module configured to provide the one or more electronic billing statements in accordance with one or more conditional directives of the particular end user that directs obfuscating of the one or more secret entities with respect to the one or more electronic billing statements when a communication device that the one or more electronic billing statements are to be provided to has reached one or more specified points or intervals of time.

27. The system of claim 25, wherein said billing statement providing module comprises:

a billing statement providing module configured to provide the one or more electronic billing statements in accordance with one or more conditional directives of the particular end user that directs obfuscating of the one or more secret entities with respect to the one or more electronic billing statements when a communication device that the one or more electronic billing statements are to be provided to is at one or more specified locations.

28. The system of claim 25, wherein said billing statement providing module comprises:

a billing statement providing module configured to provide the one or more electronic billing statements in accordance with one or more conditional directives of the particular end user that directs obfuscating of the one or more secret entities with respect to the one or more electronic billing statements when one or more third parties are in proximate vicinity of a communication device that the one or more electronic billing statements are to be provided to.

29. The system of claim 28, wherein said billing statement providing module comprises:

a billing statement providing module configured to provide the one or more electronic billing statements in accordance with one or more conditional directives of the particular end user that directs obfuscating of the one or more secret entities with respect to the one or more electronic billing statements when one or more specified third parties are in proximate vicinity of a communication device that the one or more electronic billing statements are to be provided to.

30. The system of claim 1, wherein the electronic billing statement transmitting module comprises:

an electronic billing statement transmitting module including a contextual aspect occurrence determining module configured to transmit to a communication device associated with the particular end user one or more electronic billing statements that indicate the one or more fees and that identifies the one or more secret entities, the providing being in response, at least in part, to the contextual aspect occurrence determining module determining occurrence of one or more particular contextual aspects of the communication device, the one or more particular contextual aspects being one or more environmental aspects of the communication device that at least implies absence of one or more third parties within proximate vicinity of the communication device.

31. The system of claim 30, wherein said electronic billing statement transmitting module including a contextual aspect occurrence determining module comprises:

an electronic billing statement transmitting module including a communication device time determining module configured to transmit to the communication device the one or more electronic billing statements that indicate the one or more fees and that identifies the one or more secret entities in response, at least in part, to the communication device time determining module determining that the communication device has reached one or more particular points or intervals of time.

32. The system of claim 31, wherein said electronic billing statement transmitting module including a communication device time determining module comprises:

an electronic billing statement transmitting module including a communication device time determining module configured to transmit to the communication device the one or more electronic billing statements that indicate the one or more fees and that identifies the one or more secret entities in response, at least in part, to the communication device time determining module determining that the communication device has reached one or more specified points or intervals of time as specified by the one or more conditional directives.

33. The system of claim 30, wherein said electronic billing statement transmitting module including a contextual aspect occurrence determining module comprises:

an electronic billing statement transmitting module including a communication device location determining module configured to transmit to the communication device the one or more electronic billing statements that indicate the one or more fees and that identifies the one or more secret entities in response, at least in part, to the communication device location determining module determining that the communication device is at one or more particular locations.

34. The system of claim 33, wherein said electronic billing statement transmitting module including a communication device location determining module comprises:

an electronic billing statement transmitting module including a communication device location determining module configured to transmit to the communication device the one or more electronic billing statements that indicate the one or more fees and that identifies the one or more secret entities in response, at least in part, to the communication device location determining module determining that the communication device is at one or more specified locations as specified by the one or more conditional directives.

35. The system of claim 30, wherein said electronic billing statement transmitting module including a contextual aspect occurrence determining module comprises:

an electronic billing statement transmitting module including a communication device location determining module configured to transmit to the communication device the one or more electronic billing statements that indicate the one or more fees and that identifies the one or more secret entities in response, at least in part, to the communication device location determining module determining that the communication device is outside of one or more specified locations as specified by the one or more conditional directives.

36. The system of claim 30, wherein said electronic billing statement transmitting module including a contextual aspect occurrence determining module comprises:

an electronic billing statement transmitting module including a third party proximity determining module configured to transmit to the communication device the one or more electronic billing statements that indicate the one or more fees and that identifies the one or more secret entities in response, at least in part, to the third party proximity determining module determining that the one or more third parties are not within the proximate vicinity of the communication device based on sensor provided data.

37. The system of claim 30, wherein said electronic billing statement transmitting module including a contextual aspect occurrence determining module comprises:

an electronic billing statement transmitting module including a third party proximity determining module configured to transmit to the communication device the one or more electronic billing statements that indicate the one or more fees and that identifies the one or more secret entities in response, at least in part, to the third party proximity determining module determining that the one or more third parties are not within the proximate vicinity of the communication device based on log entry data that was at least originally entered by the particular end user.

38. The system of claim 1, further comprising:

a conditional directive receiving module configured to receive from the particular end user the one or more conditional directives.

39. The system of claim 38, wherein said conditional directive receiving module comprises:

a conditional directive soliciting module configured to solicit the one or more conditional directives from the particular end user.

40. The system of claim 39, wherein said conditional directive soliciting module comprises:

an obfuscation condition soliciting module configured to solicit from the particular end user the one or more conditional directives including one or more conditions for obfuscating the one or more secret entities with respect to the one or more electronic billing statements.

41. A computer program product comprising:

an article of manufacture including a signal-bearing non-transitory storage medium bearing one or more executable instructions that when executed by one or more processing devices cause a machine to perform a method that includes at least:

associating one or more fees with one or more communiqués that were transmitted by a particular end user and addressed to one or more secret entities; and providing one or more electronic billing statements that indicate the one or more fees without at least directly identifying the one or more secret entities, the providing of the one or more electronic billing statements being in accordance with one or more conditional directives of the particular end user to conditionally obfuscate the one or more secret entities with respect to the one or more electronic billing statements, the providing of the one or more electronic billing statements including at least transmitting the one or more electronic billing statements to at least one communication device associated with the particular end user.

* * * * *